United States Patent
Yue et al.

(10) Patent No.: US 9,847,818 B2
(45) Date of Patent: Dec. 19, 2017

(54) CHANNEL STATE INFORMATION (CSI) FEEDBACK AND SUBSAMPLING

(71) Applicant: NEC Laboratories America, Inc., Princeton, NJ (US)

(72) Inventors: Guosen Yue, Plainsboro, NJ (US); Narayan Prasad, Wyncote, PA (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/295,422

(22) Filed: Jun. 4, 2014

(65) Prior Publication Data

US 2014/0362784 A1 Dec. 11, 2014

Related U.S. Application Data

(60) Provisional application No. 61/832,635, filed on Jun. 7, 2013, provisional application No. 61/864,082, filed on Aug. 9, 2013.

(51) Int. Cl.
*H04B 7/04* (2017.01)
*H04B 7/0456* (2017.01)
(Continued)

(52) U.S. Cl.
CPC ......... *H04B 7/0478* (2013.01); *H04B 7/0456* (2013.01); *H04B 7/0486* (2013.01);
(Continued)

(58) Field of Classification Search
CPC ...... H04B 7/063; H04B 7/0639; H04B 7/065; H04B 7/0026; H04B 7/0029;
(Continued)

(56) References Cited

U.S. PATENT DOCUMENTS

2009/0207784 A1  8/2009 Lee et al.
2011/0142147 A1  6/2011 Chen et al.
(Continued)

FOREIGN PATENT DOCUMENTS

JP       5874862          3/2016
KR  10-2011-0111250 A    10/2011
(Continued)

OTHER PUBLICATIONS

Huawei et al., 'Down-sampling C1 and/or C2 for PUCCH Mode 1-1 in Rel. 10', 3GPP TSG RAN WG1 #62bis, R1-105249, Xi'an, China. Oct. 11-15, 2010 (http://www.3gpp.org/ftp/tsg_ran/wg1_rl1/TSGR1_62b/Docs/) See p. 3, line 5-p. 4, line 10.
(Continued)

*Primary Examiner* — Michael M Koeth
(74) *Attorney, Agent, or Firm* — Finnegan, Henderson, Farabow, Garrett & Dunner, L.L.P.

(57) ABSTRACT

A method implemented in a base station used in a wireless communications system is disclosed. The method comprises receiving, from a user equipment, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1. Other methods, apparatuses, and systems also are disclosed.

8 Claims, 7 Drawing Sheets

(51) Int. Cl.
H04B 7/06 (2006.01)
H04L 5/00 (2006.01)
(52) U.S. Cl.
CPC ............. H04B 7/063 (2013.01); H04B 7/066 (2013.01); H04B 7/0617 (2013.01); H04B 7/0626 (2013.01); H04B 7/0639 (2013.01); H04B 7/0658 (2013.01); H04B 7/0697 (2013.01); H04L 5/0023 (2013.01); H04L 5/0057 (2013.01)
(58) Field of Classification Search
CPC .. H04B 7/0626; H04B 7/0413; H04B 7/0417; H04B 7/0486; H04B 7/0456; H04B 7/0478; H04B 7/0658; H04B 7/066
See application file for complete search history.

(56) References Cited

U.S. PATENT DOCUMENTS

| | | | |
|---|---|---|---|
| 2011/0268207 A1* | 11/2011 | Choi | H04B 7/0456 375/267 |
| 2012/0003945 A1 | 1/2012 | Liu et al. | |
| 2012/0076024 A1 | 3/2012 | Ko et al. | |
| 2012/0082248 A1 | 4/2012 | Han et al. | |
| 2012/0087425 A1 | 4/2012 | Gomadam et al. | |
| 2012/0113830 A1 | 5/2012 | Zhu et al. | |
| 2012/0218948 A1 | 8/2012 | Onggosanusi et al. | |
| 2012/0328039 A1 | 12/2012 | Mazzarese et al. | |
| 2013/0064276 A1* | 3/2013 | Kim et al. | 375/219 |
| 2013/0077709 A1 | 3/2013 | Zhou et al. | |
| 2013/0088978 A1 | 4/2013 | Mondal et al. | |
| 2013/0114655 A1* | 5/2013 | Gomadam | H04L 1/0031 375/219 |
| 2013/0114656 A1 | 5/2013 | Sayana et al. | |
| 2014/0044083 A1* | 2/2014 | Kim et al. | 370/329 |
| 2014/0328422 A1* | 11/2014 | Chen | H04B 7/0417 375/267 |
| 2014/0369279 A1* | 12/2014 | Yu | H04L 5/0053 370/329 |
| 2014/0369436 A1* | 12/2014 | Zhang et al. | 375/267 |
| 2015/0381253 A1* | 12/2015 | Kim | H04B 7/0482 370/329 |

FOREIGN PATENT DOCUMENTS

| | | |
|---|---|---|
| RU | 2 419 214 C2 | 5/2011 |
| RU | 2 438 251 C2 | 12/2011 |
| WO | 2009023850 A1 | 2/2009 |
| WO | 2013/067819 A1 | 5/2013 |
| WO | WO 2013067819 A1 * | 5/2013 ............... H04L 1/00 |
| WO | WO 2014/131031 A1 | 8/2014 |

OTHER PUBLICATIONS

R1-132738, "Way Forward of 4Tx Rank 1 and 2 Codebook Design for Downlink MIMO Enhancement in Rel-12", Alcatel-Lucent, et al.
3GPP Ts36.213, "Evolved Universal Terrestrial Radio Access (E-UTRA); Physical Channels and Modulation", v11.2.0, Mar. 2013.
R1-132738, "Way Forward of 4Tx Rank 1 and 2 Codebook Design for Downlink MIMO Enhancement in Rel-12", Alcatel-Lucent et al.
3GPP TS36.211, "Evolved Universal Terrestrial Radio Access (E-UTRA); Physical Channels and Modulation", v11.2.0, Mar. 2013.
3GPP TS36.213, "Evolved Universal Terrestrial Radio Access (E-UTRA); Physical Channels and Modulation", v11.2.0, Feb. 2013.
ZTE, 'Evaluation Results of 4Tx Code book Proposals', 3GPP TSG RAN WG1 Meeting #72bis, R1-131067, Chicago, USA, Apr. 15-19, 2013 (http://www.3gpp.org/ftp/tsg_ran/WG1_RL1/TSGR1_72b/Docs/) See pp. 1-8.
Texas Instruments, "Finalizing feedback channel of 4Tx", 3GPP TSG RAN WG1 Meeting #73 R1-131944 (May 24, 2013).
Catt, 36.213CR (Rel-10, Cat F) Correction on PMI index [online], 3GPP TSG-RAN WG1#67 R1-113795, internet <URL:http://www.3gpp.org/ftp/tsg_ran/WG1_RL1/TSGR1_67/Docs/R1-113795.zip>, Nov. 2011.
Motorola Mobility, Corrections to Rel-10 LTE-Advanced features in 36.213 [online], 3GPP TSG-RAN WG1#64 R1-111216, internet <URL:http://www.3gpp.org/ftp/tsg_ran/WG1_RL1/TSGR1_64/Docs/R1-111216.zip>, Feb. 2011.
Patent Examination Report mailed May 6, 2016, by the Australian Patent Office in counterpart Australian Patent Application No. 2015202414.
Alcatel-Lucent Shanghai Bell, "Proposals of enhanced 4Tx codebook and codebook subsampling", 3GPP TSG RAN WG1 Meeting #73, R1-132840, pp. 1-7/E, May 2013.
Catt, "Codebooks for 4 Tx rank 1-2 and its subsampling", 3GPP TSG RAN WG1 Meeting #73, R1-13xxxx, pp. 1-6/E, May 2013.
LG Electronics, "Evaluation results for 4Tx enhanced Codebook", 3GPP TSG RAN WG1 Meeting #73, R1-132839, pp. 1-8/E, May 2013.
NEC Group, "Remaining issues of enhanced 4TX Codebook", 3GPP TSG RAN WG1 Meeting #73, R1-132835, pp. 1-8/E, May 2013.
Texas Insruments, "Finalizing feedback channel of 4Tx", 3GPP TSG RAN WG1 #73, R1-131944, pp. 1-4/E, May 2013.
Japanese Office Action mailed on Jan. 27, 2016, by the Japanese Patent Office in counterpart Japanese Patent Application No. 2015-517504.
Nokia, "Finalizing PUCCH signaling design", 3GPP TSG-RAN WG1 Meeting #63, R1-106203, Nov. 2010.
Motorola, "CSI Reporting Nodes and Codebook Sub-sampling on PUCCH", 3GPP TSG RAN1 #63, R1-106504, pp. 1-8, Nov. 2010.
Motorola, "Remaining details of CSI feedback on PUCCH and PUSCH", 3GPP TSG RAN1#63, R1-106277, Nov. 2010.
ZTE, "Remaining details of PUCCH reporting modes", 3GPP TSG RAN WG1 Meeting #63, R1-105966, Nov. 2010.
Extended European Search Report mailed Mar. 9, 2016, by the European Patent Office in counterpart European Patent Application No. 14808222.5.
Samsung, "Draft CR on Rl-Reference CSI Process for Periodic Feedback", 3GPP TSG RAN WG1 #72, R1-130277, Feb. 2013.
Nokia et al., "Detailed PUCCH CSI feedback signaling design", 3GPP TSG-RAN WG1 Meeting #62bis, R1-105533, Oct. 2015.
Office Action mailed May 13, 2016, by the Russian Patent Office in counterpart Russian Patent Application No. 2015102992/07(004650).
Notification of Reasons for Refusal dated Oct. 3, 2017, by Japanese Patent Office in counterpart Japanese Patent Application 2016-201886.
Ericsson, ST-Ericsson, "Evaluations of Codebook 2a and 2b", 3GPP-RAN WG1 #73, R1-132827, pp. 1-5, (2013).
ZTE, "Consideration on Sub-Sampling of Rank 1-2 Codebook", 3GPP TSG RAN WG1 Meeting #73, R1-132843, pp. 2-6, (2013).

* cited by examiner

CHANNEL STATE INFORMATION (CSI) FEEDBACK AND SUBSAMPLING

This application claims the benefit of U.S. Provisional Application No. 61/832,635, entitled "CSI Feedback and Subsampling of 4-Tx Codebook," filed on Jun. 7, 2013, and U.S. Provisional Application No. 61/864,082, entitled "Subsampling of 4-Tx Codebook," filed on Aug. 9, 2013, the contents of both of which are incorporated herein by reference.

BACKGROUND OF THE INVENTION

The present invention relates to the codebook for wireless or mobile communications systems and, more particularly, to feedback information for the codebook.

1. Introduction

In recent 3GPP (3rd Generation Partnership Project) meetings, it has been agreed that 3GPP Release 12 (Rel. 12) or later LTE (Long Term Evolution), also known as LTE-Advanced or LTE-A, adopts a new codebook for the multiple-input and multiple-output (MIMO) with 4 transmission antennas (4-Tx) based on the double-codebook structure, i.e., the precoder G=W1W2, as for 8-Tx codebook in 3GPP Release 10.

In the latest RAN1 meeting, RAN1#73, two codebooks in [1], solution 2a and 2b, have been agreed as the only candidates for new 4-Tx codebook with 4-bit W1 codebook and 4-bit W2 codebook for both rank 1 and 2. They share the same W1 codebook with wide-spaced beams and the W2 entries for rank 1. For rank-2 W2, the two codebooks have different entries.

Codebook solution 2a in [1] can be adopted as the enhanced 4Tx codebook for rank 1 and 2.

For rank-3 and 4, it is decided that W1 is an identity matrix and W2 uses Release 8 4-Tx codeword (rank 3 and 4).

On the other hand, for the uplink periodic channel state information (CSI) feedback in physical uplink control channel (PUCCH), the number of bits packed for each CSI report is limited due to limited channel resources. Therefore, for the periodic CSI feedback based on new 4-Tx codebooks, subsampling is needed in some feedback modes.

We consider the design of subsampling of 4-Tx codebook for periodic CSI feedback in PUCCH, particularly mode 1-1 submode 1 and submode 2, and mode 2-1.

Transmission rank (sometimes called "rank") is the number of transmission layers (sometimes called "layers"). A codebook is a set of codewords. A codeword is also known as a precoder or precoding matrix.

REFERENCES

[1] R1-132738, "Way Forward of 4Tx Rank 1 and 2 Codebook Design for Downlink MIMO Enhancement in Rel-12", Alcatel-Lucent, et. al.
[2] 3GPP TS36.211 "Evolved Universal Terrestrial Radio Access (E-UTRA); Physical Channels and Modulation", v11.2.0, March 2013.
[3] 3GPP TS36.213 "Evolved Universal Terrestrial Radio Access (E-UTRA); Physical layer procedures", v11.2.0, February 2013.

BRIEF SUMMARY OF THE INVENTION

An objective of the present invention is to provide a solution to transmit from a user equipment to a base station feedback information for the codebook.

An aspect of the present invention includes a method implemented in a base station used in a wireless communications system. The method comprises receiving, from a user equipment, rank indication (RI), a first precoding matrix indicator (PMI), and a second PMI, the RI and the first PMI being jointly encoded, wherein 5 bits are used for transmission of the jointly encoded RI and first PMI, and wherein first 8 values of values expressed by the 5 bits are used for RI=1, second 8 values of the values expressed by the 5 bits are used for RI=2, a third value of the values expressed by the 5 bits is used for RI=3, a fourth value of the values expressed by the 5 bits is used for RI=4, and remaining 14 values of the values expressed by the 5 bits are reserved.

Another aspect of the present invention includes a method implemented in a user equipment used in a wireless communications system. The method comprises transmitting, to a base station, rank indication (RI), a first precoding matrix indicator (PMI), and a second PMI, the RI and the first PMI being jointly encoded, wherein 5 bits are used for transmission of the jointly encoded RI and first PMI, and wherein first 8 values of values expressed by the 5 bits are used for RI=1, second 8 values of the values expressed by the 5 bits are used for RI=2, a third value of the values expressed by the 5 bits is used for RI=3, a fourth value of the values expressed by the 5 bits is used for RI=4, and remaining 14 values of the values expressed by the 5 bits are reserved.

Still another aspect of the present invention includes a base station used in a wireless communications system. The base station comprises a receiver to receive, from a user equipment, rank indication (RI), a first precoding matrix indicator (PMI), and a second PMI, the RI and the first PMI being jointly encoded, wherein 5 bits are used for transmission of the jointly encoded RI and first PMI, and wherein first 8 values of values expressed by the 5 bits are used for RI=1, second 8 values of the values expressed by the 5 bits are used for RI=2, a third value of the values expressed by the 5 bits is used for RI=3, a fourth value of the values expressed by the 5 bits is used for RI=4, and remaining 14 values of the values expressed by the 5 bits are reserved.

Still another aspect of the present invention includes a user equipment used in a wireless communications system. The user equipment comprises a transmitter to transmit, to a base station, rank indication (RI), a first precoding matrix indicator (PMI), and a second PMI, the RI and the first PMI being jointly encoded, wherein 5 bits are used for transmission of the jointly encoded RI and first PMI, and wherein first 8 values of values expressed by the 5 bits are used for RI=1, second 8 values of the values expressed by the 5 bits are used for RI=2, a third value of the values expressed by the 5 bits is used for RI=3, a fourth value of the values expressed by the 5 bits is used for RI=4, and remaining 14 values of the values expressed by the 5 bits are reserved.

Still another aspect of the present invention includes a method implemented in a wireless communications system. The method comprises transmitting, from a user equipment to a base station, rank indication (RI), a first precoding matrix indicator (PMI), and a second PMI, the RI and the first PMI being jointly encoded, wherein 5 bits are used for transmission of the jointly encoded RI and first PMI, and wherein first 8 values of values expressed by the 5 bits are used for RI=1, second 8 values of the values expressed by the 5 bits are used for RI=2, a third value of the values expressed by the 5 bits is used for RI=3, a fourth value of the values expressed by the 5 bits is used for RI=4, and remaining 14 values of the values expressed by the 5 bits are reserved.

Still another aspect of the present invention includes a wireless communications system. The wireless communications system comprises a base station; and a user equipment to transmit, to the base station, rank indication (RI), a first precoding matrix indicator (PMI), and a second PMI, the RI and the first PMI being jointly encoded, wherein 5 bits are used for transmission of the jointly encoded RI and first PMI, and wherein first 8 values of values expressed by the 5 bits are used for RI=1, second 8 values of the values expressed by the 5 bits are used for RI=2, a third value of the values expressed by the 5 bits is used for RI=3, a fourth value of the values expressed by the 5 bits is used for RI=4, and remaining 14 values of the values expressed by the 5 bits are reserved.

Still another aspect of the present invention includes a method implemented in a base station used in a wireless communications system. The method comprises receiving, from a user equipment, rank indication (RI), a first precoding matrix indicator (PMI) (codebook index $i_1$), and a second PMI, the RI and the first PMI being jointly encoded, wherein, for RI=2, values 8-15 are assigned to the joint encoding of the RI and the first PMI ($I_{RI/PMI1}$).

Still another aspect of the present invention includes a method implemented in a user equipment used in a wireless communications system. The method comprises transmitting, to a base station, rank indication (RI), a first precoding matrix indicator (PMI) (codebook index $i_1$), and a second PMI, the RI and the first PMI being jointly encoded, wherein, for RI=2, values 8-15 are assigned to the joint encoding of the RI and the first PMI ($I_{RI/PMI1}$).

Still another aspect of the present invention includes a base station used in a wireless communications system. The base station comprises a receiver to receive, from a user equipment, rank indication (RI), a first precoding matrix indicator (PMI) (codebook index $i_1$), and a second PMI, the RI and the first PMI being jointly encoded, wherein, for RI=2, values 8-15 are assigned to the joint encoding of the RI and the first PMI ($I_{RI/PMI1}$).

Still another aspect of the present invention includes a user equipment used in a wireless communications system. The user equipment comprises a transmitter to transmit, to a base station, rank indication (RI), a first precoding matrix indicator (PMI) (codebook index $i_1$), and a second PMI, the RI and the first PMI being jointly encoded, wherein, for RI=2, values 8-15 are assigned to the joint encoding of the RI and the first PMI ($I_{RI/PMI1}$).

Still another aspect of the present invention includes a method implemented in a wireless communications system. The method comprises transmitting, from a user equipment to a base station, rank indication (RI), a first precoding matrix indicator (PMI) (codebook index $i_1$), and a second PMI, the RI and the first PMI being jointly encoded, wherein, for RI=2, values 8-15 are assigned to the joint encoding of the RI and the first PMI ($I_{RI/PMI1}$).

Still another aspect of the present invention includes a wireless communications system. The wireless communications system comprises a base station, and a user equipment to transmit, to the base station, rank indication (RI), a first precoding matrix indicator (PMI) (codebook index $i_1$), and a second PMI, the RI and the first PMI being jointly encoded, wherein, for RI=2, values 8-15 are assigned to the joint encoding of the RI and the first PMI ($I_{RI/PMI1}$).

Still another aspect of the present invention includes a method implemented in a base station used in a wireless communications system. The method comprises receiving, from a user equipment, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1.

Still another aspect of the present invention includes a method implemented in a user equipment used in a wireless communications system. The method comprises transmitting, to a base station, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1.

Still another aspect of the present invention includes a base station used in a wireless communications system. The base station comprises a receiver to receive, from a user equipment, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1.

Still another aspect of the present invention includes a user equipment used in a wireless communications system. The user equipment comprises a transmitter to transmit, to a base station, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1.

Still another aspect of the present invention includes a method implemented in a wireless communications system. The method comprises transmitting, from a user equipment to a base station, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1.

Still another aspect of the present invention includes a wireless communications system comprises a base station, and a user equipment to transmit, to the base station, rank indication (RI), a first precoding matrix indicator (PMI), and a second PMI (codebook index $i_2$), wherein values 0-15 are assigned to the second PMI $I_{PMI2}$ for RI=1 and values 0-3 are assigned to the second PMI $I_{PMI2}$ for each of RI=2, RI=3, and RI=4, and wherein codebook index $i_2$ comprises $I_{PMI2}$ for RI=1.

DETAILED DESCRIPTION

2 Enhanced 4-Tx Codebooks

Figure 1:
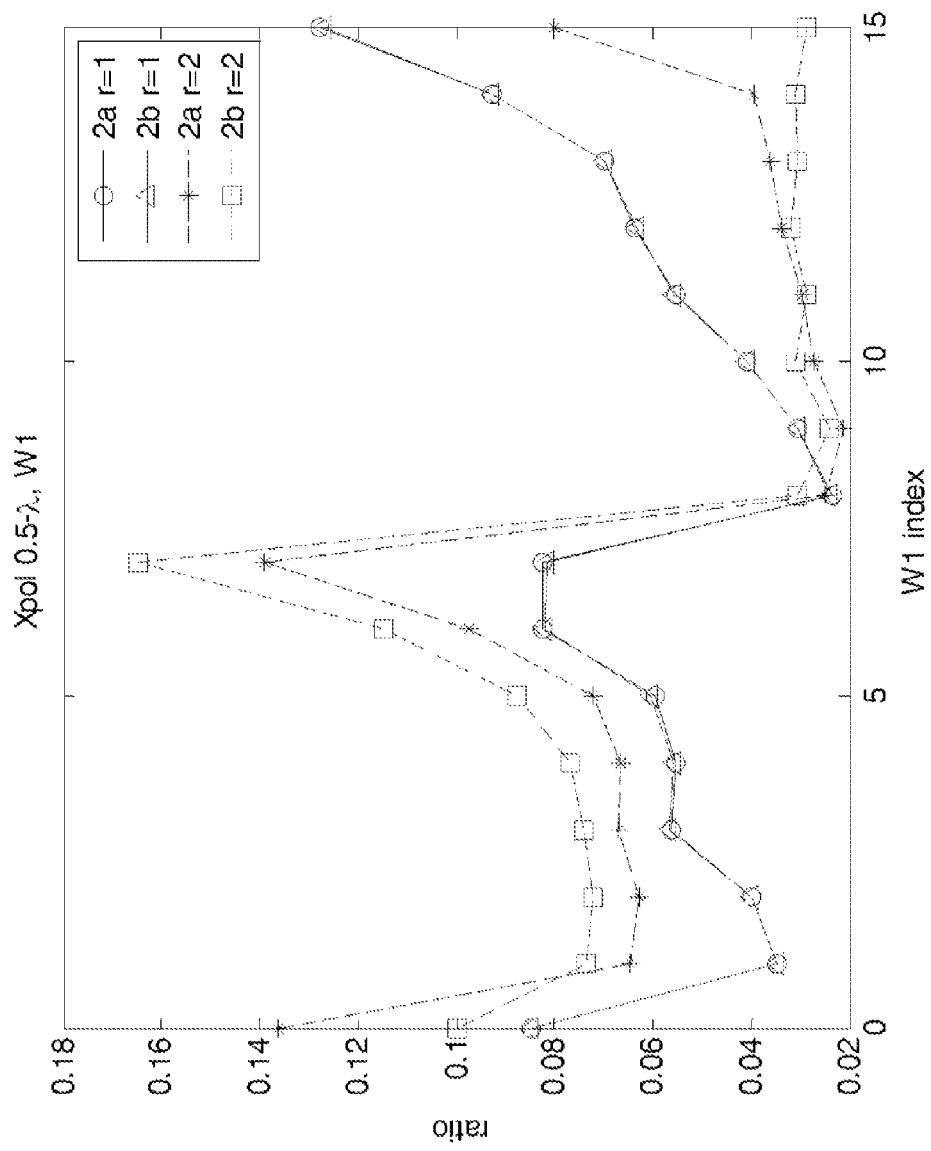
FIG. 1 depicts W1 statistics for codebook 2a and 2b for rank 1 and 2 in cross-polarized (Xpol) antennas with ½-λ antenna spacing.

2.1 Enhanced 4-Tx Codebooks for Rank 1 and 2

In agreed work assumption, two solutions (solution 2a and 2b) in [1] are selected for enhanced 4-Tx codebook candidates for rank 1 and 2, which are described as follows.

Solution 2a:

$$W_1 = \begin{bmatrix} X_n & 0 \\ 0 & X_n \end{bmatrix}$$

where $n = 0, 1, \ldots, 15$ $$X_n = \begin{bmatrix} 1 & 1 & 1 & 1 \\ q_1^n & q_1^{n+8} & q_1^{n+16} & q_1^{n+24} \end{bmatrix}$$

where $q_1 = e^{j2\pi/32}$

For rank 1, $$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $$W_{2,n} \in \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}$$

and $(Y_1, Y_2) = (e_i, e_k) \in \{(e_1, e_1), (e_2, e_2),$
$(e_3, e_3), (e_4, e_4), (e_1, e_2), (e_2, e_3), (e_1, e_4), (e_2, e_4)\}$;

Solution 2b:

$$W_1 = \begin{bmatrix} X_n & 0 \\ 0 & X_n \end{bmatrix}$$

where $n = 0, 1, \ldots, 15$ $$X_n = \begin{bmatrix} 1 & 1 & 1 & 1 \\ q_1^n & q_1^{n+8} & q_1^{n+16} & q_1^{n+24} \end{bmatrix}$$

where $q_1 = e^{j2\pi/32}$

For rank 1, $$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\} (Y_1, Y_2) \in$$
$\{(e_2, e_4)\}$ and $$W_{2,n} \in \left\{ \frac{1}{2}\begin{bmatrix} Y_1 & Y_2 \\ Y-1 & -Y_2 \end{bmatrix}, \frac{1}{2}\begin{bmatrix} Y_1 & Y_2 \\ jY_1 & -jY_2 \end{bmatrix} \right\} (Y_1, Y_2) \in$$
$\{(e_1, e_1)(e_2, e_2), (e_3, e_3), (e_4, e_4)\}$ and $$W_{2,n} \in \left\{ \frac{1}{2}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

In both codebooks, $e_i$ denotes a 4 by 1 vector with the ith entry being 1 and zero for all other entries. We can see the only difference between codebook 2a and 2b are rank-2 W2 entries. Among 16 entries of rank-2 W2 entries, they share 9 entries.

Following the same W1W2 index structures for 8-Tx codebook in 3GPP TS36.213, we first fix the indices for these two codebooks as follows:

For W1 with index $i_1$, we have $$W_1 = \begin{bmatrix} X_{i_1} & 0 \\ 0 & X_{i_1} \end{bmatrix},$$

$i_1 = 0, 1, \ldots, 15$ where $$X_{i_1} = \begin{bmatrix} 1 & 1 & 1 & 1 \\ q_1^{i_1} & q_1^{i_1+8} & q_1^{i_1+16} & q_1^{i_1+24} \end{bmatrix},$$

$q_1 = e^{2\pi j/16}$.

For W2 rank 1, denote k as the index for the 4 entries of $$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}$$

and $\underline{i}$ as the index for the column selection $e_i$ and co-phasing term $\alpha(i)$ as in $Y \in \{e_1, e_2, e_3, e_4\}, \alpha(i) = q_1^{2(i-1)}$.

We then define W2 index $i_2 = (i-1)*4+k-1$, $i=1, 2, 3, 4$, $k=1, 2, 3, 4$, for rank-1 precoding matrix.

For W2 rank 2 in solution 2a, denote k, k=1, 2, as the index for the two entries in $$W_{2,n} \in \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}$$

and i, i=1, ..., 8, as the index for the column selection pairs as in $(Y_1, Y_2) \in \{(e_1,e_1),(e_2,e_2),(e_3,e_3),(e_4,e_4),(e_1,e_2),(e_2,e_3),$
$(e_1,e_4),(e_2,e_4)\}$ We then define rank-2 W2 index $i_2$ as $i_2 = (i-1)*2+k-1$ for solution 2a.

We can see that rank-2 W2 of $i_2=0, \ldots, 7$ in solution 2a also appear in solution 2b, we adopt the same index $i_2$ for these 8 entries for rank-2 W2 in solution 2b.

Then we define $i_2=8, \ldots, 11$, for following 4 entries in the listed order $$W_{2,n} \in \left\{ \begin{bmatrix} Y_1 & Y_2 \\ Y_1 & Y_2 \end{bmatrix}, \begin{bmatrix} Y_1 & Y_2 \\ Y_1 & -Y_2 \end{bmatrix}, \begin{bmatrix} Y_1 & Y_2 \\ -Y_1 & Y_2 \end{bmatrix}, \begin{bmatrix} Y_1 & Y_2 \\ -Y_1 & -Y_2 \end{bmatrix} \right\},$$

$(Y_1, Y_2) \in \{(e_2, e_4)\}$ and $i_2=12, \ldots, 15$, for following 4 entries in the listed order $$W_{2,n} \in \left\{ \begin{bmatrix} Y_1 & Y_2 \\ Y_2 & -Y_1 \end{bmatrix} \right\},$$

$(Y_1, Y_2) \in \{(e_1, e_3), (e_2, e_4), (e_3, e_1), (e_4, e_2)\}$

Note that the rank-2 W2 of $i_2=9$ in solution 2b is the same as the entry of $i_2=14$ in solution 2a.

2.2 Enhanced 4-Tx Codebooks for Rank 3 and 4

For rank 3 and 4 in the new codebooks, W1 is identity matrix, and W2 uses Release 8 codebook as in [2].

3 CSI Feedback in PUCCH Based on New 4-Tx Codbook

For Release 8 4-Tx codebook, there are 16 precoding codewords for each rank, which requires a 4-bit overhead for precoding matrix indicator (PMI) feedback. This can be handled for periodic CSI feedback in PUCCH. Therefore, no subsampling on the codebook is needed.

However, when double codebook is adopted and each codebook is 4-bit size, the feedback overhead is too large if we send the full CSI feedbacks. To reduce the feedback overhead, we propose the following subsampling schemes on the enhanced 4-Tx codebook for various feedback modes.

encoding of R1 and W1 information has been adopted. In 3GPP Release 10, 5-bit is used to represent an entry of R1 and W1 for 8-Tx codebook. Thus subsampling is required as total number of entries of R1 and W1 for 8-Tx would be more than 32.

With the enhanced 4-Tx codebook, the total number of entries for R1 and W1 information is 34 (16 each for rank 1 and 2, 2 entries for rank 3 and 4, assuming agreed 4-bit W1 for 4-Tx codebooks). Thus subsampling is also required for the enhanced 4-Tx codebook.

We now propose the following solutions for subsampling of R1 and W1 (first PMI) entries for PUCCH mode 1-1, submode 1, for 4 antenna ports based on new 4-Tx codebook structure:

I. For the first 16 entries, we select 8 W1 entries (subsampled form 16 W1 codewords as in Section 2.1) each for rank 1 and rank 2, which can be represented by 4 bits. For rank 3 and 4, since W1 is fixed to the identity, we only needs two entries represent the rank. Thus for 4-antenna ports, 4-layer spatial multiplexing, total 5 bits are needed for the feedback of joint encoded RI and first PMI. Thus, there are 14 entries are not in use, which can be reserved for future usage. If 2-layer spatial multiplexing for 4-antenna ports, e.g., a rank restriction is indicated by the network, i.e., rank<=2, only 4-bit payload size is needed for feedback of joint encoded RI and PMI.

II. To reduce feedback and number of redundant, unused entries, we can pack all entries with a total 4-bit payload size for PUCCH feedback. This can be solved into two following alternatives:

a. For the first 8 entries, we select 4 W1 entries (subsampled form 16 W1 codewords as in Section 2.1) each for rank 1 and rank 2, which can be represented by a 3-bit payload. For rank 3 and 4, additional two entries representing the rank information are included which makes the total 4 bits. Thus for 4-antenna ports, 4-layer spatial multiplexing, total 4 bits are needed for the feedback of joint encoded RI and first PMI. Thus, there are 6 entries are not in use, which can be reserved for future usage. If 2-layer spatial multiplexing for 4-antenna ports, e.g., a rank restriction is indi-

TABLE 1

W1 beam components in enhanced 4Tx codebook.

| | W1 index $i_1$ | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Beams in W1 | 0 | 1 | 2 | 3 | 4 | 5 | 6 | 7 | 8 | 9 | 10 | 11 | 12 | 13 | 14 | 15 |
| | 8 | 9 | 10 | 11 | 12 | 13 | 14 | 15 | 16 | 17 | 18 | 19 | 20 | 21 | 22 | 23 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |

3.1 PUCCH CSI Feedback Mode 1-1 Submode 1

In PUCCH CSI feedback mode 1-1, users are configured to report a RI, a wideband channel quality indicator (CQI, quantized SINR or signal-to-interference-plus-noise ratio) and a wideband precoding matrix indicator (PMI) to the network in a CSI process. The feedback of rank indicator or rank indication (RI), CQI and PMI can be configured with different periodicity. With double codebook structures, two indexes corresponding to W1 and W2 are feedback. Since W1 captures the channel condition in a relatively long term and large bandwidth, the feedback of W1 index (first PMI) can be configured in a longer period than that of W2. In submode 1 of PUCCH feedback mode 1-1, the feedback of R1 and W1 is configured in the same periodicity. Thus joint cated by the network, i.e., rank<=2, only 3-bit payload size is needed for feedback of joint encoded RI and PMI.

b. In this approach, 14 entries are used to represent the joint RI and first PMI for rank 1 and 2. The entries can be equally split, i.e., 7 for each rank. Different numbers can also adopted as the statistics of rank 1 and rank 2 could be different. For rank 3 and 4, additional two entries representing the rank information are included which makes the total 4 bits. Thus total 4 bits are needed for the feedback of joint encoded RI and first PMI with or without rank restriction for the CSI feedback. Compared with 2a, this certainly brings some performance can as more W1 codewords are retained for rank 1 and 2. Compared alternative solution 1, it is expected only a slight performance degradation as only 1 less W1 codewords are in solution 2b than that in 1, but one bit feedback overhead is saved.

Based on above alternative subsampling schemes for PUCCH CSI feedback mode 1-1 submode 1, feedback of jointly encoder RI and the first PMI, we now provide some detailed design solutions as follows.

TABLE 1.1

A design subsampling based on Alternative I in PUCCH mode 1-1 submode 1 based on 4-Tx codebook with double codebook (W1W2) structure.

| Value of joint encoding of RI and the first PMI $I_{RI/PMI\ 1}$ | RI | Codebook index $i_1$ |
|---|---|---|
| 0-7 | 1 | 0, 2, 4, 6, 8, 10, 12, 14, or $2I_{RI/PMI\ 1}$ |
| 8-15 | 2 | 0, 2, 4, 6, 8, 10, 12, 14, or $2(I_{RI/PMI\ 1} - 8)$ |
| 16 | 3 | NA |
| 17 | 4 | NA |
| 18-31 | reserved | NA |

A subsampling design based on Alt. I is provided in Table 1.1. It is a solution with simple specification. We now also provide several other designs which might have a certain performance improvement. First, we resort to the system level simulations to obtain statistics of W1 selections in codebook 2a and 2b. Note that although the W1 codebooks are same in 2a and 2b, the rank-2 codebooks are different, which could affect the W1 statistics slightly. The results of W1 statistics for Xpol antennas with ½-λ and 4-λ antenna spacing are presented in FIG. 1 and FIG. 2, respectively.

We can see that for rank-2, W1 codewords with index $i_1$=0, 1, . . . , 7 are most selected for both codebooks (The only exception is for 2a, $i_1$=15 also has a high percentage.) For simplicity, we can use $i_1$=0, 1, . . . , 7 for rank-2. For rank-1, it is a little complicated. For the case of close spaced (0.5-λ) antennas, $i_1$=0, 6, 7, 13, 14, 15, have higher selection ratios than others. For the case of wide (4-λ) spaced antennas shown in FIG. 2, W1 with $i_1$=0, 15 have higher ratios than others. One design criterion for subsampling of W1 for rank-1 could be including {$i_1$=0, 7, 13, 15} as a subset for any subsampling codebooks for this feedback mode 1-1 submode 1. Since the same column (beam) in two consecutive W1s have the small beam spacing, thus for rank-1, we can still adopt equal interval subsampling $i_1$, either the set {1, 3, 5, 7, 9, 11, 13, 15} or the set {0, 2, 4, 6, 8, 10, 12, 14}.

Also as shown in Table 1, since two W1s with index $i_1$ and $i_1$+8 consist of same beam components, for rank 2, there are many overlaps on the final codewords among these two W1 codeword sets. Thus one way is taking {$i_1$}={0, 1, . . . , 7} as the subsampled W1 for mode 1-1, submode 1.

For rank 1, thanks to the co-phasing term, α(i), the codeword redundancy issue due to complete beam overlap among W1 is gone. It would be beneficial to have the beams span in all angle space with a uniform beam spacing for the same beam and co-phasing term selections from a W2 entry. Therefore, it is better to have the subsampling of W1 for rank 1 as {$i_1$|$i_1$=0, 2, 4, 6, 8, 10, 12, 14}.

The design solution of 4-Tx codebook subsampling for PUCCH mode 1-1 submode 1 is then summarized in Table 1.2 in which we take {0, 2, 4, 6, 8, 10, 12, 14} for rank-1 based on above discussions.

TABLE 1.2

A codebook subsampling design based on Alternative I in PUCCH mode 1-1 submode 1 based on 4-Tx codebook with double codebook (W1W2) structure.

| Value of joint encoding of RI and the first PMI $I_{RI/PMI\ 1}$ | RI | Codebook index $i_1$ |
|---|---|---|
| 0-7 | 1 | {0, 2, 4, 6, 8, 10, 12, 14} ($2I_{RI/PMI\ 1}$) |
| 8-15 | 2 | 0, 1, 2, 3, 4, 5, 6, 7 ($I_{RI/PMI\ 1} - 8$) |
| 16 | 3 | NA |
| 17 | 4 | NA |
| 18-31 | reserved | NA |

Figure 2:
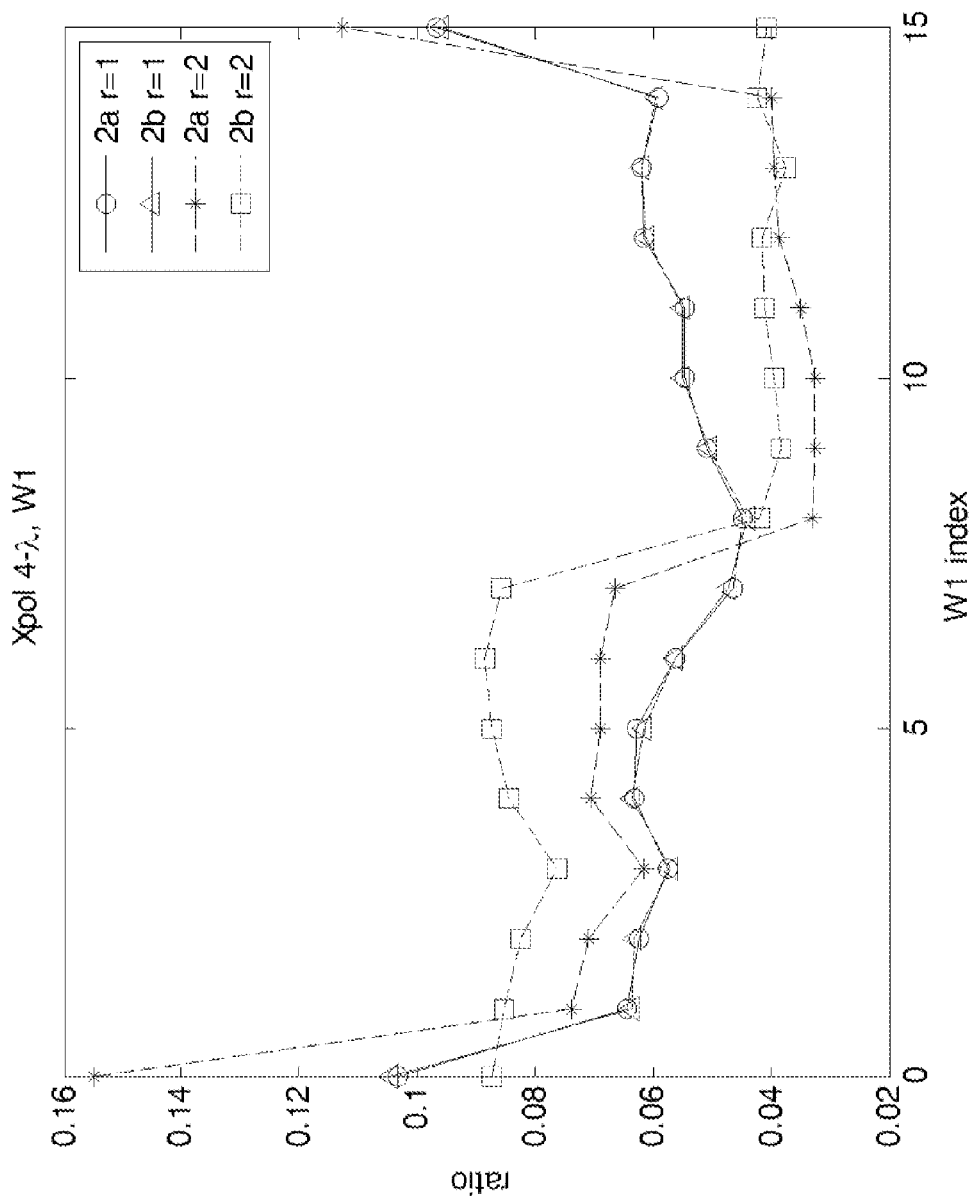
FIG. 2 depicts W1 statistics for codebook 2a and 2b for rank 1 and 2 in cross-polarized (Xpol) antennas with 4-λ antenna spacing.

Based on subsampling scheme Alt II-a, and the W1 statistics in FIG. 1 and FIG. 2, we form a codebook subsampling design solution shown in Table 1.3. Since for rank 2, as shown in FIG. 1, W1 with i1=0, 7 are quite dominant for close spaced antennas compared their neighbors, we then keep them and select {0, 3, 5, 7} as the subsampling results for rank-2. For rank 1, we still choose the equally spaced W1's.

TABLE 1.3

A codebook subsampling design example based on Alternative II-a in PUCCH mode 1-1 submode 1 based on 4-Tx codebook with double codebook (W1W2) structure.

| Value of joint encoding of RI and the first PMI $I_{RI/PMI\ 1}$ | RI | Codebook index $i_1$ |
|---|---|---|
| 0-3 | 1 | 0, 4, 8, 12 ($4I_{RI/PMI\ 1}$) |
| 4-7 | 2 | 0, 3, 5, 7 |
| 8 | 3 | NA |
| 9 | 4 | NA |
| 10-15 | reserved | NA |

Based on subsampling scheme Alt II-b, and the W1 statistics in FIG. 1 and FIG. 2, we form a codebook subsampling design solution shown in Table 1.4. Since for Alt II-b, we have total 14 entries for joint RI and the first PMIs for rank 1 and 2, we cannot have equally spaced W1s. Based on the statistics shown in FIGS. 1, and 2, we provide a solution in Table 1.4. Here we consider 7 entries for each rank. However, the number of entries can be different as the importance or statistics of rank 1 and rank 2 can be different. For example, for MU-MIMO pairing, it has been shown that paired user with rank-1 transmissions are better. Thus it would be better have more entries (less subsampling) for rank 1 than rank 2.

TABLE 1.4

A codebook subsampling design example based on Alternative II-a in PUCCH mode 1-1 submode 1 based on 4-Tx codebook with double codebook (W1W2) structure.

| Value of joint encoding of RI and the first PMI $I_{RI/PMI\ 1}$ | RI | Codebook index $i_1$ |
|---|---|---|
| 0-6 | 1 | 0, 2, 4, 7, 10, 13, 15 |
| 7-13 | 2 | 0, 2, 4, 5, 6, 7, 15 |
| 14 | 3 | NA |
| 15 | 4 | NA |

If one of the proposed alternatives is adopted, the report type (type-5 report [3]) shall be modified for 4 antenna ports when new codebook is configured. The modified type 5 report is given in Tables 2.1-2.3 for alternative I, II-a, and II-b, respectively.

TABLE 2.1

Modified report type to accommodate feedback alternative
I in PUCCH mode 1-1 submode 1 based on 4-Tx codebook
with double codebook (W1W2) structure.

| PUCCH report type | Reported information | state | Number of bits |
|---|---|---|---|
| 5 | RI/first PMI | 4/8 antenna ports, 2-layer spatial multiplexing | 4 |
|   |   | 4/8 antenna ports, 4-layer spatial multiplexing | 5 |

TABLE 2.2

Report type defined for feedback alternative II-a
in PUCCH mode 1-1 submode 1 based on 4-Tx codebook
with double codebook (W1W2) structure.

| PUCCH report type | Reported information | state | Number of bits |
|---|---|---|---|
| 5 | RI/first PMI | 4 antenna ports, 2-layer spatial multiplexing | 3 |
|   |   | 4 antenna ports, 4-layer spatial multiplexing | 4 |
|   |   | 8 antenna ports, 2-layer spatial multiplexing | 4 |
|   |   | 8 antenna ports, 4-layer spatial multiplexing | 5 |

TABLE 2.3

Modified report type to accommodate feedback alternative
II-b in PUCCH mode 1-1 submode 1 based on 4-Tx codebook
with double codebook (W1W2) structure.

| PUCCH report type | Reported information | state | Number of bits |
|---|---|---|---|
| 5 | RI/first PMI | 8 antenna ports, 2-layer spatial multiplexing or 4 antenna ports | 4 |
|   |   | 8 antenna ports, 4-layer spatial multiplexing | 5 |

3.2A PUCCH CSI Feedback Mode 1-1 Submode 2

In submode 2 of PUCCH CSI feedback mode 1-1, the user can be configured to report the CQI and complete preferred precoder information (first PMI for W1 and second PMI for W2). Thus total number of feedback bits would be 12 bits (4-bit CQI, 4-bit W1 and 4-bit W2) for rank 1 CSI feedback, 15 bits (two CQIs 7 bit+4-bit W1, 4-bit W2) for rank 2 feedback, or 11 bits (7 bits for two CQIs, 4 bits for W2) for rank 3 or rank 4 feedback. For PUCCH, currently maximum number of bits for each report is 11-bits. Thus, codebook subsampling is needed for rank-1 and 2 feedback when PUCCH feedback mode 1-1 submode 2 is configured, while there is no need of codebook subsampling for rank-3 and 4.

We then propose the following two alternatives for rank-1/2 codebook subsampling for enhanced 4-Tx codebook:

III. For both rank-1 and rank-2, we select the total 16 entries for W1/W2 (the first PMI and second PMI). Thus the total number of bits for PMI is 4 for both rank-1 and 2.

IV. For rank-2, we select 16 entries for W1/W2. But for rank-1 since only one CQI is reported which uses 4 bits, we can subsample less for the rank-1 codewords to improve the performance. One design example is given below in which uses total 7 bits.

We now discuss the design based on above proposed two alternatives.

For alternative III, when 4 bits are allocated for W1/W2 reporting, we consider 3/1 splitting, i.e., 3 bits are allocated for W1 and 1 bit for W2.

For sub-sampling the inner codebook (W1) we can simply sub-sample the centers in a uniform manner. Note that the wideband codebook has the following 16 centers [0:15]/32.

To get a 3-bit subsampled version we can simply choose the 8 inner codewords (W1) with indexes {0, 2, 4, 6, 8, 10, 12, 14} or as discussed in section 3.1A, we consider {0, 2, 4, 6, 8, 10, 12, 14} for rank 1 and {0, 1, 2, 3, 4, 5, 6, 7} for rank-2.

For sub-sampling the outer codebook (W2), we can enforce a criterion in the rank-2 case that at-least one outer codeword in the sub-sampled codebook enables selecting orthogonal beams from the inner codeword. Using this criterion an example 2 bit rank-2 outer sub-sampled codebook 2a is to use $(e_1,e_1)$ with the 2 co-phasing options and $(e_2,e_4)$ with the 2 co-phasing options.

Figure 3:
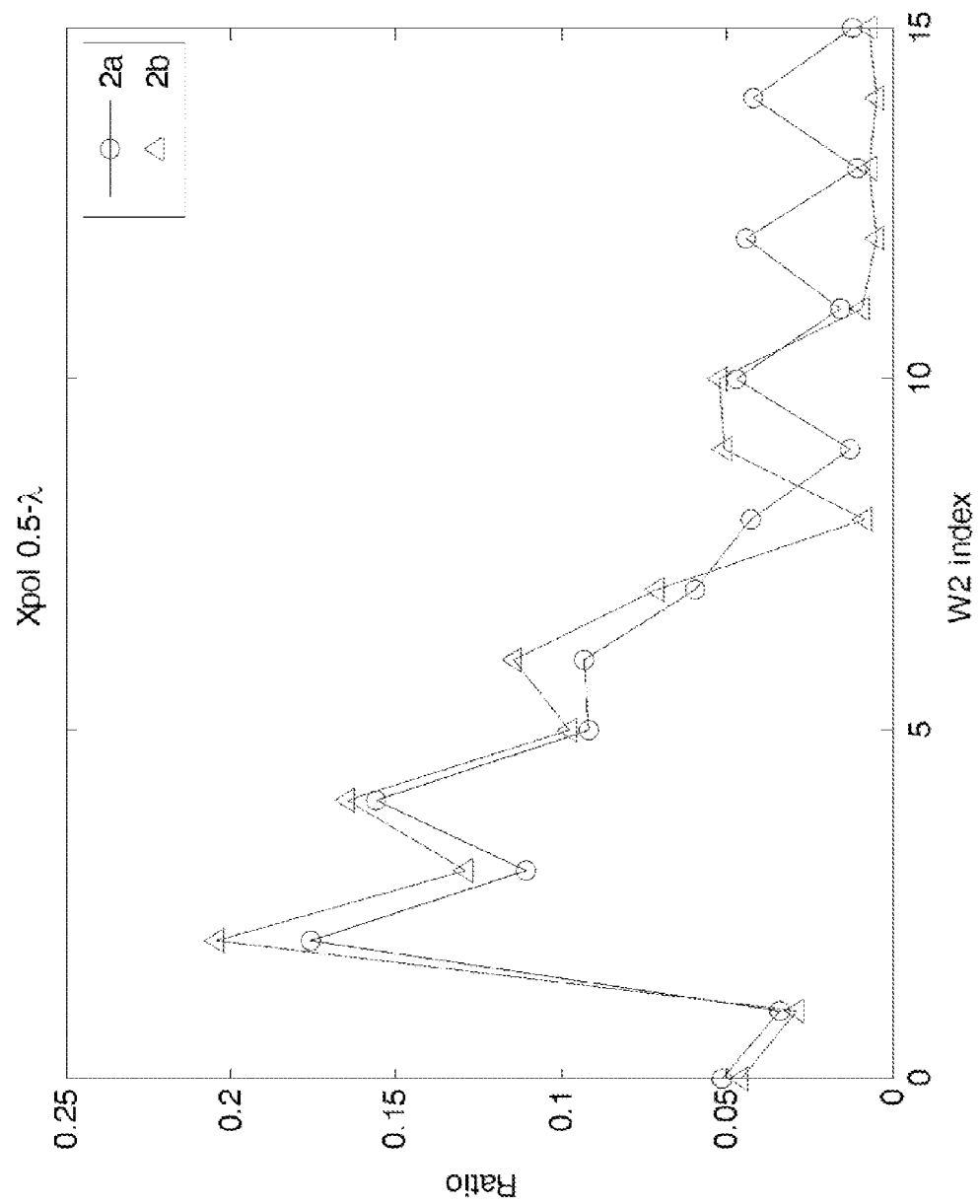
FIG. 3 depicts W2 statistics for codebook 2a and 2b for 2 in cross-polarized (Xpol) antennas with 0.5-λ antenna spacing.
Figure 4:
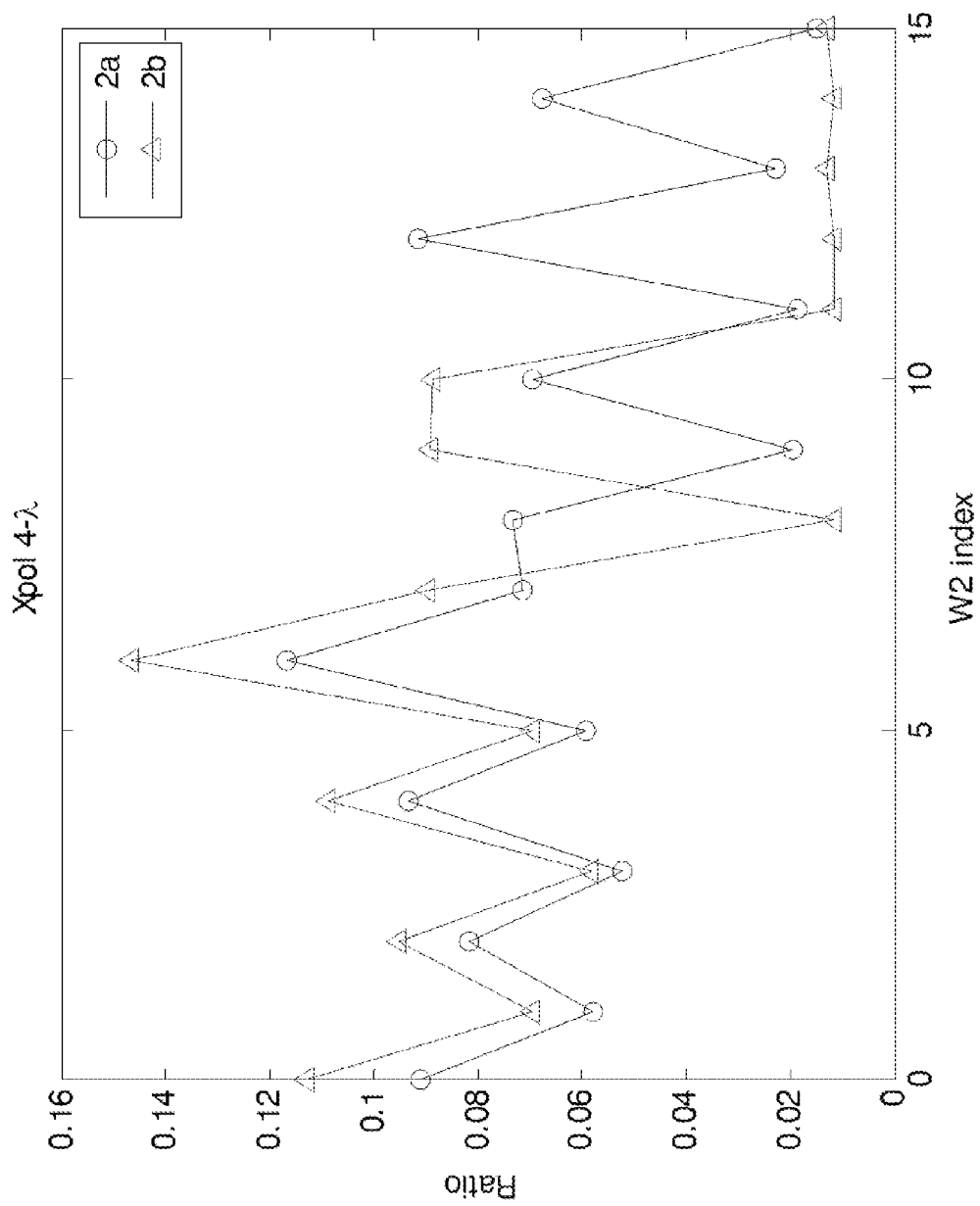
FIG. 4 depicts W2 statistics for codebook 2a and 2b for 2 in cross-polarized (Xpol) antennas with 4-λ antenna spacing.

Or based on the average ratios of W2 selections for rank 2 from the original codebooks obtained via simulations shown in FIGS. 3, and 4, we can select two of $\{(e_1,e_1), (e_2,e_2), (e_3,e_3), (e_4,e_4)\}$ with the first co-phasing option.

Figure 5A:
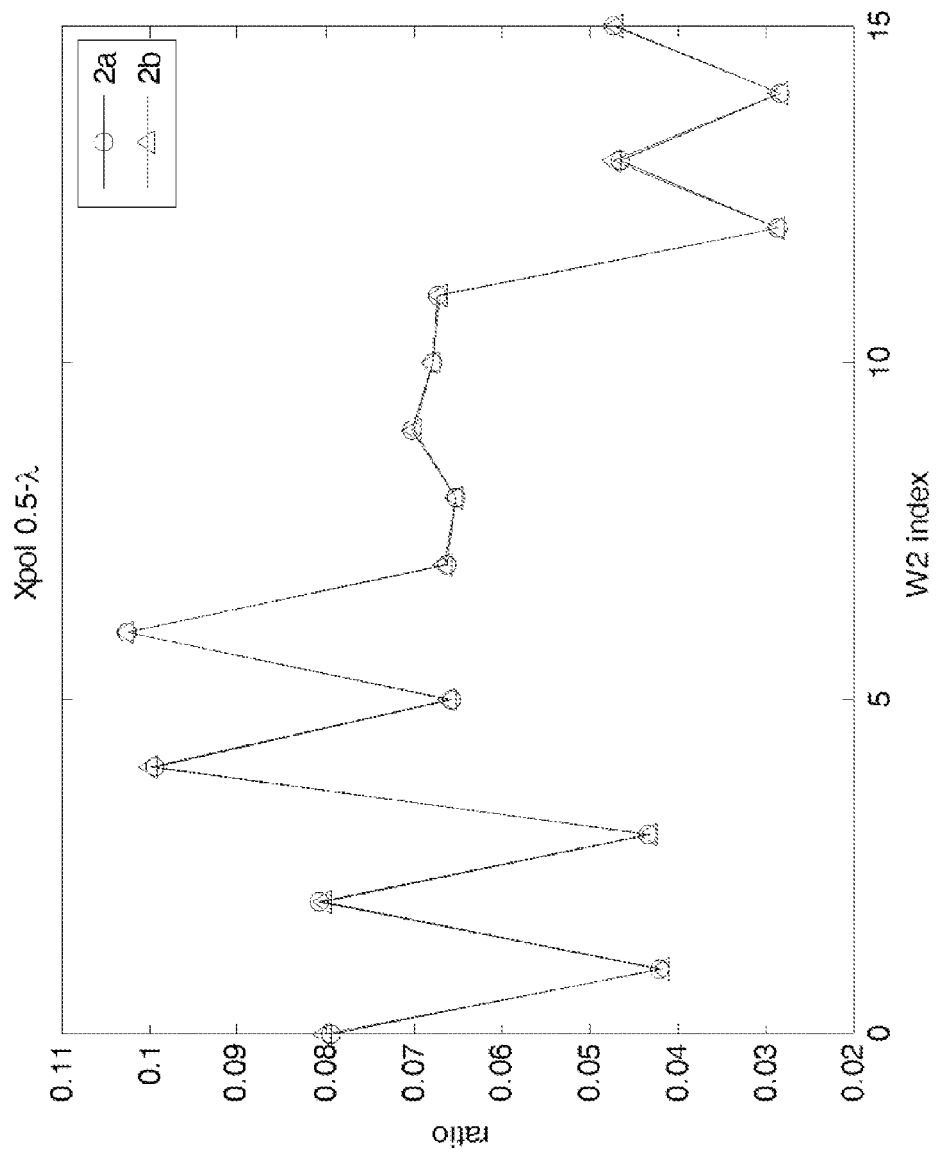
FIG. 5 depicts W2 statistics for codebook 2a and 2b for 2 in cross-polarized (Xpol) antennas (a) with 0.5-λ antenna spacing and (b) with 4-λ antenna spacing.
Figure 5B:
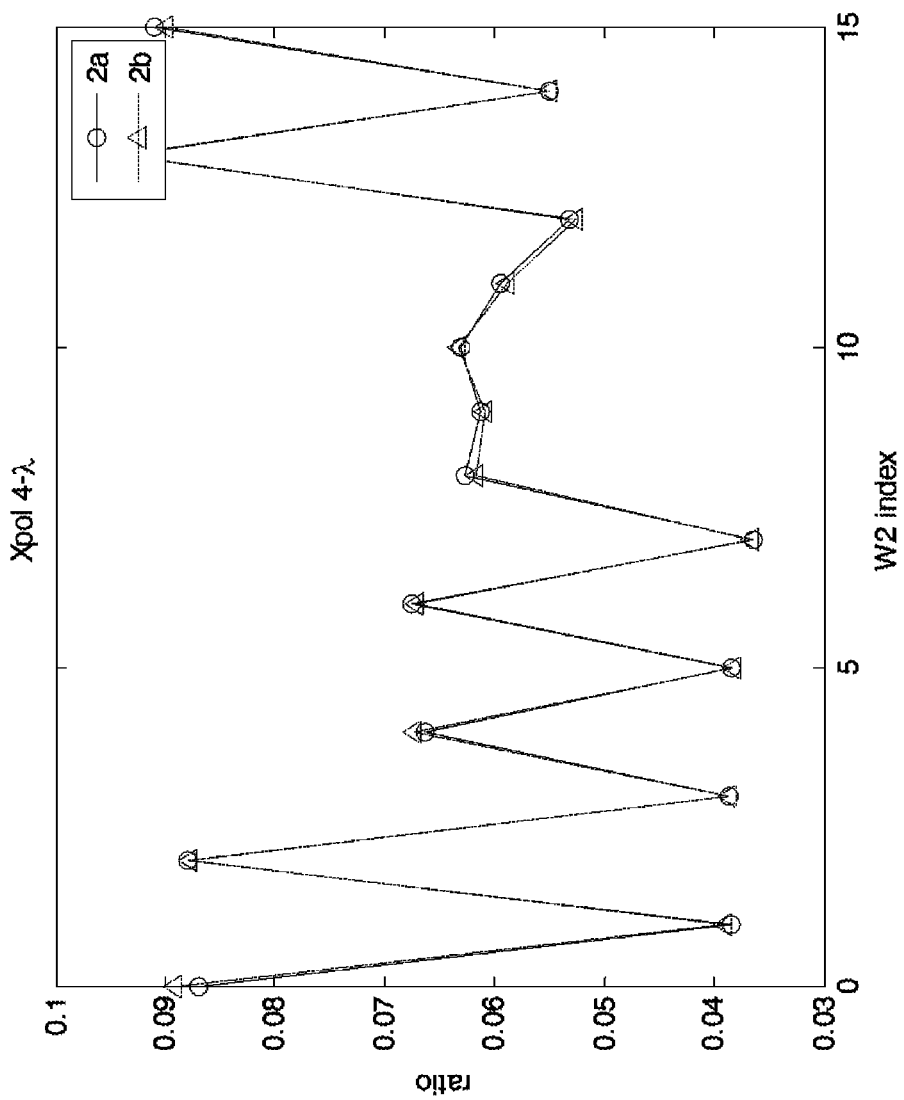

Also based on the average ratios of W2 selections for rank 1 from the original codebooks obtained via simulations shown in FIG. 5, we can select two of $\{(e_1), (e_2), (e_3), (e_4)\}$ with the first co-phasing option, e.g. $\{(e_1,e_1), (e_3,e_3)\}$ with $$W_{2,n} \frac{1}{\sqrt{2}} \begin{bmatrix} Y \\ \alpha(i)Y \end{bmatrix}$$

with $$Y \in \{e_1, , e_3\}, \alpha(i) = q_1^{2(i-1)}.$$

TABLE 3.1A

A codebook subsampling design example based on Alternative
III in PUCCH mode 1-1 submode 2 based on 4-Tx codebook
with double codebook (W1W2) structure.

| | Relationship between the first PMI value and codebook index $i_1$ | | Relationship between the second PMI value and codebook index $i_2$ | | |
|---|---|---|---|---|---|
| RI | Value of the first PMI $I_{PMI\ 1}$ | Codebook index $i_1$ | Value of the second PMI $I_{PMI\ 2}$ | Codebook index $i_2$ | total #bits |
| 1 | 0-7 | {0, 2, 4, 6, 8, 10, 12, 14} | 0-1 | 0, 8 | 4 |
| 2 | 0-7 | {0, 1, 2, 3, 4, 5, 6, 7} | 0-1 | 0, 4 | 4 |
| 3 | NA | NA | 0-15 | $I_{PMI\ 2}$ (no subsampling) | 4 |
| 4 | NA | NA | 0-15 | $I_{PMI\ 2}$ (no subsampling) | 4 |

TABLE 3.2A

A codebook subsampling design example based on Alternative IV in PUCCH mode 1-1 submode 2 based on 4-Tx codebook with double codebook (W1W2) structure.

| | Relationship between the first PMI value and codebook index $i_1$ | | Relationship between the second PMI value and codebook index $i_2$ | | |
|---|---|---|---|---|---|
| RI | Value of the first PMI $I_{PMI\ 1}$ | Codebook index $i_1$ | Value of the second PMI $I_{PMI\ 2}$ | Codebook index $i_2$ | total #bits |
| 1 | 0-15 | 0-15 | 0-7 | 0, 2, 4, 6, 8, 10, 12, 14 | 7 |
| 2 | 0-7 | {0, 1, 2, 3, 4, 5, 6, 7} | 0-1 | 0, 4 | 4 |
| 3 | NA | NA | 0-15 | $I_{PMI\ 2}$ (no subsampling) | 4 |
| 4 | NA | NA | 0-15 | $I_{PMI\ 2}$ (no subsampling) | 4 |

For alternative IV, for rank-1, total payload size is 7 for W1/W2. Thus we only need to sub-sampling rank-1 W2 codebooks. We now consider sub-sampling for the enhanced codebook in the rank-1 case. Since the inner codebooks are identical and the rank-1 outer codebooks are the same for codebooks 2a and 2b, we can consider either one of them in this procedure.

We consider the case when the sub-sampled outer codebook size is 8 so that Q=(8 choose 2)=28). For rank-1 both Chordal distance and Fubini Study are equivalent distance measures and the following 16 choices were found to have near-optimal metrics:

```
           Columns 1 through 16

0  0  0  0  0  0  0  0  1  1  1  1  1  1  1  1
 2  2  2  2  2  2  2  2  3  3  3  3  3  3  3  3
 4  4  4  4  5  5  5  5  4  4  4  4  5  5  5  5
 6  6  6  6  7  7  7  7  6  6  6  6  7  7  7  7
 8  8  9  9  8  8  9  9  8  8  9  9  8  8  9  9
10 10 11 11 10 10 11 11 10 10 11 11 10 10 11 11
12 13 12 13 12 13 12 13 12 13 12 13 12 13 12 13
14 15 14 15 14 15 14 15 14 15 14 15 14 15 14 15
```

Again, further down selection can be done by comparing with the average ratios of W2 selections from the original codebooks obtained via simulations.

Certain other criteria can be used (or can be imposed on top of the aforementioned procedures) for sub-sampling.

Based on the above and simulation results shown in FIG. 5 for average ratio of rank-1 W2 selections, {0, 2, 4, 6, 8, 10, 12, 14} can be adopted for codebook subsampling for PUCCH mode 1-1 submode 2.

If one of the proposed alternatives is adopted, the report type (type-2c report [3]) shall be modified for 4 antenna ports when new codebook is configured. The modified type 2c report is given in Tables 4.1A-4.2A for alternative III and IV, respectively.

TABLE 4.1A

Modified report type 2c to accommodate feedback alternative III in PUCCH mode 1-1 submode 2 based on 4-Tx codebook with double codebook (W1W2) structure.

| PUCCH report type | Reported information | state | Number of bits |
|---|---|---|---|
| 2c | Wideband CQI/first PMI/second PMI | 4/8 antenna ports RI = 1 | 8 |
| | | 4/8 antenna ports 1 < RI ≤ 4 | 11 |
| | | 8 antenna ports 4 < RI ≤ 7 | 9 |
| | | 8 antenna ports RI = 8 | 7 |

TABLE 4.2A

Modified report type 2c to accommodate feedback alternative IV in PUCCH mode 1-1 submode 2 based on 4-Tx codebook with double codebook (W1W2) structure.

| PUCCH report type | Reported information | state | Number of bits |
|---|---|---|---|
| 2c | Wideband CQI/first PMI/second PMI | 4/8 antenna ports RI = 1 | 11 |
| | | 4/8 antenna ports 1 < RI ≤ 4 | 11 |
| | | 8 antenna ports 4 < RI ≤ 7 | 9 |
| | | 8 antenna ports RI = 8 | 7 |

3.2B PUCCH CSI Feedback Mode 1-1 Submode 2

In submode 2 of PUCCH CSI feedback mode 1-1, the user can be configured to report the CQI and complete preferred precoder information (first PMI for W1 and second PMI for W2). Thus total number of feedback bits would be 12 bits (4-bit CQI, 4-bit W1 and 4-bit W2) for rank 1 CSI feedback, 15 bits (two CQIs 7 bit+4-bit W1, 4-bit W2) for rank 2 feedback, or 11 bits (7 bits for two CQIs, 4 bits for W2) for rank 3 or rank 4 feedback. For PUCCH, currently maximum number of bits for each report is 11-bits. Thus, codebook subsampling is needed for rank-1 and 2 feedback when PUCCH feedback mode 1-1 submode 2 is configured, while there is no need of codebook subsampling for rank-3 and 4.

We then propose the following two alternatives for rank-1/2 codebook subsampling for enhanced 4-Tx codebook:

III. For both rank-1 and rank-2, we select the total 16 entries for W1/W2 (the first PMI and second PMI). Thus the total number of bits is 4 for both rank-1 and 2.

IV. For rank-2, we select 16 entries for W1/W2. But for rank-1 since only one CQI is reported which uses 4 bits, we can subsample less for the rank-1 codewords to improve the performance. Two design examples are given below which use total 7 bits.

We now discuss the design based on proposed two alternatives.

For alternative III, when 4 bits are allocated for W1/W2 reporting, we first consider 3/1 splitting, i.e., 3 bits are allocated for W1 and 1 bit for W2.

For sub-sampling the inner codebook (W1) we can simply sub-sample the centers in a uniform manner. Note that the wideband codebook has the following 16 centers [0:15]/32. To get a 3-bit subsampled version we can simply choose the 8 inner codewords (W1) with indexes {0, 2, 4, 6, 8, 10, 12, 14} or as discussed in section 3.1B, we can consider {0, 2, 4, 6, 8, 10, 12, 14} for rank 1 and {0, 1, 2, 3, 4, 5, 6, 7} for rank-2.

For sub-sampling the outer codebook (W2), we can optionally enforce a criterion in the rank-2 case that at-least one outer codeword in the sub-sampled codebook enables selecting orthogonal beams from the inner codeword. Using this criterion an example 1 bit rank-2 outer sub-sampled codebook is formed by (e2, e4) with the 2 co-phasing options corresponding to i2 in {14, 15}. This choice of W2 can be used with subsampled W1 {0, 1, 2, 3, 4, 5, 6, 7} or more preferably used with W1 indices {0, 2, 4, 6, 8, 10, 12, 14} for more balanced sampling.

Alternatively, based on the average ratios of W2 selections for rank 2 from the original codebooks obtained via simulations shown in FIGS. 3, and 4, we can select two of $\{(e_1, e_1), (e_2, e_2), (e_3, e_3) (e_4, e_4)\}$ with the first co-phasing option. For instance, we can select $\{(e_1, e_1), (e_3, e_3)\}$ as W2 subsampling. Then we can select the first co-phasing entry for each beam pair, i.e., $i_2=0, 4$. However, with this selection, the selected beams are not in uniform beam spacing. Thus, if we do not restrict to have the same subsampling for W1 as in submode 1, we can apply the subsampling of $i_1 \in \{0, 2, 4, 6, 8, 10, 12, 14\}$ for W1. Then with subsampling of $\{(e_1, e_1), (e_3, e_3)\}$, we have the beam selections with a uniform separation.

Also for rank 1 from the original codebooks, we can choose two of $\{(e_1), (e_2), (e_3) (e_4)\}$ which select two orthogonal beams. Thus two rank-1 codewords with same W1 will be orthogonal. Hence we can choose either $\{(e_1), (e_3)\}$ or $\{(e_2) (e_4)\}$ pair with a fixed cophasing term. For example with $\{(e_1), (e_3)\}$, we have $$W_{2,n} \frac{1}{\sqrt{2}} \begin{bmatrix} Y \\ \alpha(i)Y \end{bmatrix}$$

with $$Y \in \{e_1, e_3\}, \alpha(i) = q_1^{2(i-1)}.$$

For the co-phasing terms, we can simply choose the first entry of each one, i.e. $(\alpha(1), k=1)$ or $i_2=0$ for $e_1$, $(\alpha(3), k=1)$ or $i_2=8$ for $e_3$. We can see for $i_2=0$, the co-phasing term is 1. Then it is just the beam selection. For $i_2=8$, the overall co-phasing term is $q_1^4$. The results are summarized in Table 3.1B.

TABLE 3.1B

A codebook subsampling design example based on Alternative III in PUCCH mode 1-1 submode 2 based on 4-Tx codebook with double codebook (W1W2) structure.

| | Relationship between the first PMI value and codebook index $i_1$ | | Relationship between the second PMI value and codebook index $i_2$ | | |
|---|---|---|---|---|---|
| RI | Value of the first PMI $I_{PMI\,1}$ | Codebook index $i_1$ | Value of the second PMI $I_{PMI\,2}$ | Codebook index $i_2$ | total #bits |
| 1 | 0-7 | {0, 2, 4, 6, 8, 10, 12, 14} | 0-1 | 0, 8 | 4 |
| 2 | 0-7 | {0, 1, 2, 3, 4, 5, 6, 7} or {0, 2, 4, 6, 8, 10, 12, 14} | 0-1 | 0, 4 | 4 |
| 3 | NA | NA | 0-15 | $I_{PMI\,2}$ (no subsampling) | 4 |
| 4 | NA | NA | 0-15 | $I_{PMI\,2}$ (no subsampling) | 4 |

If different bit splitting is allowed for rank-1, we can have 2/2 bit splitting, i.e., allocate 2 bits for W1 subsampling and 2 bits for W2 subsampling. Under this option, we can select $i_1 \in \{0, 2, 4, 6\}$ for W1 and $\{(e_1), (e_2), (e_3), (e_4)\}$ for W2 subsampling with a certain k or set of k. With this solution, we can still cover beam space with a uniform beam spacing, just with a co-phasing term changed for every 4 codewords instead of 8. With k=1, we have overall co-phasing terms given by 1, $q_1^2$, $q_1^4$, $q_1^6$ for i=1, 2, 3, 4 (i.e., $\{(e_1), (e_2), (e_3), (e_4)\}$) respectively. The resulting subsampling for rank 1 W2 is $i_2 \in \{0, 4, 8, 12\}$. This subsampling design solution is summarized in Table 3.2B.

TABLE 3.2B

A codebook subsampling design example based on Alternative III in PUCCH mode 1-1 submode 2 based on 4-Tx codebook with double codebook (W1W2) structure.

| | Relationship between the first PMI value and codebook index $i_1$ | | Relationship between the second PMI value and codebook index $i_2$ | | |
|---|---|---|---|---|---|
| RI | Value of the first PMI $I_{PMI\,1}$ | Codebook index $i_1$ | Value of the second PMI $I_{PMI\,2}$ | Codebook index $i_2$ | total #bits |
| 1 | 0-3 | {0, 2, 4, 6} | 0-3 | {0, 4, 8, 12} | 4 |
| 2 | 0-7 | {0, 1, 2, 3, 4, 5, 6, 7} or {0, 2, 4, 6, 8, 10, 12, 14} | 0-1 | 0, 4 | 4 |
| 3 | NA | NA | 0-15 | $I_{PMI\,2}$ (no subsampling) | 4 |
| 4 | NA | NA | 0-15 | $I_{PMI\,2}$ (no subsampling) | 4 |

TABLE 3.3B

A codebook subsampling design example based on Alternative IV in PUCCH mode 1-1 submode 2 based on 4-Tx codebook with double codebook (W1W2) structure.

| | Relationship between the first PMI value and codebook index $i_1$ | | Relationship between the second PMI value and codebook index $i_2$ | | |
|---|---|---|---|---|---|
| RI | Value of the first PMI $I_{PMI\,1}$ | Codebook index $i_1$ | Value of the second PMI $I_{PMI\,2}$ | Codebook index $i_2$ | total #bits |
| 1 | 0-15 | 0-15 | 0-7 | 0, 2, 4, 6, 8, 10, 12, 14 | 7 |
| 2 | 0-7 | {0, 1, 2, 3, 4, 5, 6, 7} or {0, 2, 4, 6, 8, 10, 12, 14} | 0-1 | 0, 4 | 4 |
| 3 | NA | NA | 0-15 | $I_{PMI\,2}$ (no subsampling) | 4 |
| 4 | NA | NA | 0-15 | $I_{PMI\,2}$ (no subsampling) | 4 |

For alternative IV, for rank-1, total payload size is 7 for W1/W2. We first consider sub-sampling only rank-1 W2 codebook in the enhanced codebook in the rank-1 case.

We consider the case when the sub-sampled outer codebook size is 8 (so that Q=(8 choose 2)=28). For rank-1 both Chordal distance and Fubini Study are equivalent distance measures and the following 16 choices were found to have near-optimal metrics:

Columns 1 through 16

```
 0  0  0  0  0  0  0  0  1  1  1  1  1  1  1  1
 2  2  2  2  2  2  2  2  3  3  3  3  3  3  3  3
 4  4  4  4  5  5  5  5  4  4  4  4  5  5  5  5
 6  6  6  6  7  7  7  7  6  6  6  6  7  7  7  7
 8  8  9  9  8  8  9  9  8  8  9  9  8  8  9  9
10 10 11 11 10 10 11 11 10 10 11 11 10 10 11 11
12 13 12 13 12 13 12 13 12 13 12 13 12 13 12 13
14 15 14 15 14 15 14 15 14 15 14 15 14 15 14 15
```

Again, further down selection can be done by comparing with the average ratios of W2 selections from the original codebooks obtained via simulations.

Certain other criteria can be used (or can be imposed on top of the aforementioned procedures) for sub-sampling.

Based on the above and simulation results shown in FIG. 5 for average ratio of rank-1 W2 selections, {0 2 4 6 8 10 12 14} can be adopted for codebook subsampling for PUCCH mode 1-1 submode 2, as summarized in Table 3.3B.

We also note in the rank-1 case with 7 bit total load, we can instead retain the 4 bit W2 codebook and subsample W1 codebook instead. In this case our preference is to uniformly subsample W1 as {0 2 4 6 8 10 12 14} to better cover the beam angular space.

If one of the proposed alternatives is adopted, the report type (type-2c report [3]) shall be modified for 4 antenna ports when new codebook is configured. The modified type 2c report is given in Tables 4.1B-4.2B for alternative III and IV, respectively.

TABLE 4.1B

Modified report type 2c to accommodate feedback alternative III in PUCCH mode 1-1 submode 2 based on 4-Tx codebook with double codebook (W1W2) structure.

| PUCCH report type | Reported information | state | Number of bits |
|---|---|---|---|
| 2c | Wideband CQI/first PMI/second PMI | 4/8 antenna ports RI = 1 | 8 |
| | | 4/8 antenna ports 1 < RI ≤ 4 | 11 |
| | | 8 antenna ports 4 < RI ≤ 7 | 9 |
| | | 8 antenna ports RI = 8 | 7 |

TABLE 4.2B

Modified report type 2c to accommodate feedback alternative IV in PUCCH mode 1-1 submode 2 based on 4-Tx codebook with double codebook (W1W2) structure.

| PUCCH report type | Reported information | state | Number of bits |
|---|---|---|---|
| 2c | Wideband CQI/first PMI/second PMI | 4/8 antenna ports 1 ≤ RI ≤ 4 | 11 |
| | | 8 antenna ports 4 < RI ≤ 7 | 9 |
| | | 8 antenna ports RI = 8 | 7 |

3.3A PUCCH CSI Feedback Mode 2-1

In PUCCH CSI feedback mode 2-1, the user can be configured to report the preferred subband with the corresponding preferred PMI and CQI. For the subband CQI/PMI report, L bits are allocated to report user preferred subband index. When double codebook structure is configured, the use needs to report the CQI and second PMI (for W2). With additional L bits for the subband reporting, the feedback payload size for CQI and second PMI is reduced. For 8-Tx codebook, maximum 9 bits are allocated for subband CQI/second PMI reporting. With the same payload size constraint, we propose the following codebook subsampling for different ranks, which is summarized in Table 5.1A:

For rank 1, only one CQI is reported. Thus subsampling is not needed. The total number of bits would be 8.

We now first discuss the subsampling of rank 3 and 4 codebook. Note that for W2, Release 8 codebooks have been adopted for rank-3 and 4. With 2 bits subsampling, we need to select 4 out of 16 codewords.

TABLE 5.1A

Relationship between the second PMI value and codebook index $i_2$

| RI | Value of the second PMI $I_{PMI\,2}$ | Codebook index $i_2$ |
|---|---|---|
| 1 | 0-15 | $I_{PMI\,2}$ (no subsampling) |
| 2 | 0-3 | 4 entries as discussed in the text |
| 3 | 0-3 | 4 entries as discussed in the text |
| 4 | 0-3 | 4 entries as discussed in the text |

Rank-3: The sub-sampling to select 4 out of 16 codewords can be done using either the Chordal distance or the Fubini-Study distance measure. Typically chordal distance is more suitable for lower SNRs whereas Fubini-Study is good at larger SNRs.

For any given choice of 4 codewords (comprising a sub-sampled codebook) we have 6 pairs. For each such pair (comprising of two 4×3 semi-unitary matrix codewords) we can compute a distance. The metric for that choice can be defined to be the minimum of the six distances. Finally, we can select the preferred choice as the one whose associated metric is the largest (i.e., maximum metric).

There can be multiple choices whose associated metrics are either equal to the maximum or are within a small margin (say 2% or 5%) of the maximum. All such choices are valid selections and represent good candidates.

In total there are 1820 choices (16 choose 4). We find that there are 5 choices whose metrics are equal to the maximum upon using the Chordal distance as the distance measure. Surprisingly these are the same choices whose metrics are again equal to the maximum when using the Fubini-Study distance as the distance measure. These indices are {0 2 8 10}, {0 9 10 11}, {1 2 3 8}, {1 3 9 11}, {12 13 14 15}.

Indeed no other choices have metrics in either case that are within 5% of the maximum. Thus, any one of these 5 choices is a good selection.

For rank-4: each codeword is a 4×4 unitary matrix so the distance (either Chordal distance or Fubini-Study) among any two pair of codewords is zero. Thus, a convenient way for sub-sampling is to re-use the indices obtained for the rank-3 case in the rank-4 legacy codebook, to obtain a sub-sampled rank-4 codebook.

For rank-2, for the enhanced codebooks the situation is a bit more complex since there are multiple inner (wideband) codewords.

Consider the sub-sampling to obtain a size 4 (2-bit) outer codebook (W2) from the original outer codebook of size 16.

For each one of the 1820 choices, we can consider each one of the 16 inner codewords and determine the Q distances (where Q is the number of pairs in the sub-sampled outer codebook and is 6 in this example) and then associate the minimum among the Q distances with that inner codeword for that choice. Then, the 16 associated distances (with the 16 inner codewords for that choice) can be combined in a suitable manner into one metric associated with that choice (a suitable way can be a product of the distances or their geometric mean with some regularization etc.). The one or more choices whose metric s are equal to the maximum (or are within a margin of the maximum) can be determined to be suitable candidates.

Upon performing the aforementioned procedure for rank-2 (with sub-sampled outer codebook size 4 so that Q=6) and the enhanced codebook 2a, we found the following 4 choices (sets of indices out of the 1820 possible ones) that have (near-) maximal metrics under both Chordal distance as well as the Fubini-Study distance:

{6 8 11 14}, {6 9 10 15}, {7 8 11 14}, {7 9 10 15}.

The following 8 choices (out of the 1820) have maximal metrics under Chordal distance:

{2 6 14 15}, {2 7 14 15}, {3 6 14 15}, {3 7 14 15}, {6 8 14 15}, {6 9 14 15}, {7 8 14 15}, {7 9 14 15}.

The following 164 choices (out of the 1820) have (near-) maximal metrics under Chordal distance. Each choice (comprising of 4 indices) is one column in the following:

Columns 1 through 20

```
0  0  0   0   0  0  0   0   0   0   0   0   0   0  0   0   0  0  0   0
2  2  2   2   2  2  2   2   2   2   2   2   2   3  3   3   3  3  3   3
4  4  4   4   5  5  5   5   6   6   7   7  14   4  4   4   4  5  5   5
6  7  14  15  6  7  14  15  14  15  14  15 15   6  7  14  15  6  7  14
```

Columns 21 through 40

```
0   0   0   0   0   0   0   0   0   0   0   0   0   0   0   0   0   0   0   0
3   3   3   3   3   3   4   4   4   4   4   5   5   5   5   5   6   6   6   7
5   6   6   7   7  14   6   6   7   7  14   6   6   7   7  14  10  11  14  10
15  14  15  14  15  15  14  15  14  15  15  14  15  15  14  15  15  14  15  15
```

Columns 41 through 60

```
0   0   1  1  1   1  1  1   1   1   1   1   1   1  1   1   1  1  1   1
7   7   2  2  2   2  2  2   2   2   2   2   2   2  3   3   3  3  3   3
11  14  4  4  4   4  5  5   5   6   6   7   7  14  4   4   4  4  5
14  15  6  7  14  15 6  7  14  15  14  15  15  6  7  14  15  6
```

Columns 61 through 80

```
1  1   1   1   1   1   1   1   1   1   1   1   1   1   1   1   1   1   1   1
3  3   3   3   3   3   3   3   4   4   4   4   4   5   5   5   5   5   6   6
5  5   5   6   6   7   7  14   6   6   7   7  14   6   6   7   7  14  10  11
7  14  15  14  15  14  15  15  14  15  14  15  15  14  15  14  15  15  15  14
```

Columns 81 through 100

```
1   1   1   1   2  2   2   2   2   2   2   2   2   2   2   2   2   2   2   2
6   7   7   7   4  4   4   4   4   4   5   5   5   5   5   5   5   6   6   7
14  10  11  14  6  6   7   7  12  13  14   6   6   7   7  12  13  14  14  14
15  15  14  15  14 15  14  15  15  14  15  14  15  14  15  15  14  15  15  15
```

Columns 101 through 120

```
3   3   3   3   3   3   3   3   3   3   3   3   3   3   3   3   4   4   4   4
4   4   4   4   4   4   4   5   5   5   5   5   5   5   6   7   6   6   6   6
6   6   7   7  12  13  14   6   6   7   7  12  13  14  14  14   8   8   9   9
14  15  14  15  15  14  15  14  15  14  15  15  14  15  15  15  14  15  14  15
```

Columns 121 through 140

```
4   4   4   4   4   4   4   4   4   4   4   5   5   5   5   5   5   5   5   5
6   7   7   7   7   7   8   8   8   9   9   9   6   6   6   6   6   7   7   7
14  8   8   9   9  14  12  13  14  12  13  14   8   8   9   9  14   8   8   9
15  14  15  14  15  15  15  14  15  14  15  15  14  15  14  15  15  14  15  14
```

-continued

Columns 141 through 160

| 5 | 5 | 5 | 5 | 5 | 5 | 5 | 5 | 6 | 6 | 6 | 6 | 6 | 6 | 7 | 7 | 7 | 7 | 7 | 7 |
|---|---|---|---|---|---|---|---|---|---|---|---|---|---|---|---|---|---|---|---|
| 7 | 7 | 8 | 8 | 8 | 9 | 9 | 9 | 8 | 8 | 8 | 9 | 9 | 9 | 8 | 8 | 8 | 9 | 9 | 9 |
| 9 | 14 | 12 | 13 | 14 | 12 | 13 | 14 | 10 | 11 | 14 | 10 | 11 | 14 | 10 | 11 | 14 | 10 | 11 | 14 |
| 15 | 15 | 15 | 14 | 15 | 15 | 14 | 15 | 15 | 14 | 15 | 15 | 14 | 15 | 15 | 14 | 15 | 15 | 14 | 15 |

Columns 161 through 164

| 8 | 8 | 9 | 9 |
|---|---|---|---|
| 10 | 11 | 10 | 11 |
| 12 | 13 | 12 | 13 |
| 15 | 14 | 15 | 14 |

Next, upon performing the aforementioned procedure for rank-2 and the enhanced codebook 2b we found the following 54 choices (out of the 1820) that have (near-) maximal metrics under both Chordal distance as well as the Fubini-Study distance:

Columns 1 through 20

| 0 | 0 | 0 | 0 | 1 | 1 | 1 | 1 | 2 | 2 | 2 | 2 | 2 | 2 | 2 | 2 | 2 | 2 | 2 | 2 |
|---|---|---|---|---|---|---|---|---|---|---|---|---|---|---|---|---|---|---|---|
| 4 | 4 | 5 | 5 | 4 | 4 | 5 | 5 | 6 | 6 | 6 | 6 | 6 | 6 | 6 | 7 | 7 | 7 | 7 | 7 |
| 8 | 13 | 8 | 13 | 8 | 13 | 8 | 13 | 8 | 8 | 8 | 9 | 9 | 10 | 12 | 8 | 8 | 8 | 9 | 9 |
| 11 | 15 | 11 | 15 | 11 | 15 | 11 | 15 | 9 | 10 | 11 | 10 | 11 | 11 | 14 | 9 | 10 | 11 | 10 | 11 |

Columns 21 through 40

| 2 | 2 | 2 | 2 | 2 | 2 | 3 | 3 | 3 | 3 | 3 | 3 | 3 | 3 | 3 | 3 | 3 | 3 | 3 | 3 |
|---|---|---|---|---|---|---|---|---|---|---|---|---|---|---|---|---|---|---|---|
| 7 | 7 | 8 | 8 | 8 | 9 | 6 | 6 | 6 | 6 | 6 | 6 | 6 | 7 | 7 | 7 | 7 | 7 | 7 | 7 |
| 10 | 12 | 9 | 9 | 10 | 10 | 8 | 8 | 8 | 9 | 9 | 10 | 12 | 8 | 8 | 8 | 9 | 9 | 10 | 12 |
| 11 | 14 | 10 | 11 | 11 | 11 | 9 | 10 | 11 | 10 | 11 | 11 | 14 | 9 | 10 | 11 | 10 | 11 | 11 | 14 |

Columns 41 through 54

| 3 | 3 | 3 | 3 | 6 | 6 | 6 | 6 | 7 | 7 | 7 | 7 | 8 | 9 |
|---|---|---|---|---|---|---|---|---|---|---|---|---|---|
| 8 | 8 | 8 | 9 | 8 | 8 | 8 | 9 | 8 | 8 | 8 | 9 | 9 | 10 |
| 9 | 9 | 10 | 10 | 9 | 9 | 10 | 10 | 9 | 9 | 10 | 10 | 10 | 13 |
| 10 | 11 | 11 | 11 | 10 | 11 | 11 | 11 | 10 | 11 | 11 | 11 | 11 | 15 |

The following 42 choices (out of the 1820) have maximal metrics under Chordal distance:

Columns 1 through 20

| 2 | 2 | 2 | 2 | 2 | 2 | 2 | 2 | 2 | 2 | 2 | 2 | 2 | 2 | 2 | 2 | 3 | 3 | 3 | 3 |
|---|---|---|---|---|---|---|---|---|---|---|---|---|---|---|---|---|---|---|---|
| 6 | 6 | 6 | 6 | 6 | 6 | 7 | 7 | 7 | 7 | 7 | 7 | 9 | 9 | 9 | 10 | 6 | 6 | 6 | 6 |
| 9 | 9 | 9 | 10 | 10 | 13 | 9 | 9 | 9 | 10 | 10 | 13 | 10 | 10 | 13 | 13 | 9 | 9 | 9 | 10 |
| 10 | 13 | 15 | 13 | 15 | 15 | 10 | 13 | 15 | 13 | 15 | 15 | 13 | 15 | 15 | 15 | 10 | 13 | 15 | 13 |

Columns 21 through 40

| 3 | 3 | 3 | 3 | 3 | 3 | 3 | 3 | 3 | 3 | 3 | 6 | 6 | 6 | 6 | 7 | 7 | 7 | 7 |
|---|---|---|---|---|---|---|---|---|---|---|---|---|---|---|---|---|---|---|
| 6 | 6 | 7 | 7 | 7 | 7 | 7 | 7 | 9 | 9 | 9 | 10 | 9 | 9 | 9 | 10 | 9 | 9 | 9 | 10 |
| 10 | 13 | 9 | 9 | 9 | 10 | 10 | 13 | 10 | 10 | 13 | 13 | 10 | 10 | 13 | 13 | 10 | 10 | 13 | 13 |
| 15 | 15 | 10 | 13 | 15 | 13 | 15 | 15 | 13 | 15 | 15 | 15 | 13 | 15 | 15 | 15 | 13 | 15 | 15 | 15 |

-continued

Columns 41 through 42

9  9
10 10
12 13
14 15

A majority (1462 out of 1820) of the choices have near-maximal metrics under Chordal distance which implies that achieving near-optimal metric under both Chordal and Fubini-Study distances is a better option for sub-sampling in this case.

Further down selection can be done by comparing with the average ratios of W2 selections from the original codebooks obtained via simulations.

We note that the Chordal distance and Fubini Study distance are more suitable to uncorrelated channels (such as those seen with wide antenna spacing).

For closely spaced antennas resulting in more correlated channels, we prefer to have more outer codebook entries for which the two columns in the resulting rank-2 codeword comprise of identical beam selections.

Based on above discussion and results shown in FIGS. 3 and 4, we find $\{0, 2, 4, 8\}$ could be a good option, for W2 subsampling, indicating that for 2a, and 2b, $$W_{2,n} \in \left\{ \begin{bmatrix} Y_1 & Y_2 \\ Y_1 & -Y_2 \end{bmatrix} \right\}$$

with $(Y_1, Y_2) \in \{(e_1, e_1), (e_2, e_2), (e_3, e_3), (e_4, e_4)\}$ are selected.

Thus the examples of the subsampling solutions for different ranks (each for one rank) for PUCCH feedback mode 2-1 are presented in Table 5.2A.

TABLE 5.2A

PUCCH mode 2-1 codebook subsampling for 4-Tx codebook.

Relationship between the second PMI value and codebook index $i_2$

| RI | Value of the second PMI $I_{PMI\ 2}$ | Codebook index $i_2$ |
|---|---|---|
| 1 | 0-15 | $I_{PMI\ 2}$ (no subsampling) |
| 2 | 0-3 | $\{0\ 2\ 4\ 6\}$ |
| 3 | 0-3 | $\{0\ 2\ 8\ 10\}$ |
| 4 | 0-3 | $\{0\ 2\ 8\ 10\}$ |

3.3B PUCCH CSI Feedback Mode 2-1

In PUCCH CSI feedback mode 2-1, the user can be configured to report the preferred subband with the corresponding preferred PMI and CQI. For the subband CQI/PMI report, L bits are allocated to report user preferred subband index. When double codebook structure is configured, the use needs to report the CQI and second PMI (for W2). With additional L bits for the subband reporting, the feedback payload size for CQI and second PMI is reduced. For 8-Tx codebook, maximum 9 bits are allocated for subband CQI/second PMI reporting. With the same payload size constraint, we propose the following codebook subsampling for different ranks, which is summarized in Table 5.1B:

For rank 1, only one CQI is reported. Thus subsampling is not needed. The total number of bits would be 8.

We now first discuss the subsampling of rank 3 and 4 codebook. Note that for W2, Release 8 codebooks have been adopted for rank-3 and 4. With 2 bits subsampling, we need to select 4 out of 16 codewords.

TABLE 5.1B

Relationship between the second PMI value and codebook index $i_2$

| RI | Value of the second PMI $I_{PMI\ 2}$ | Codebook index $i_2$ |
|---|---|---|
| 1 | 0-15 | $I_{PMI\ 2}$ (no subsampling) |
| 2 | 0-3 | 4 entries as discussed in the text |
| 3 | 0-3 | 4 entries as discussed in the text |
| 4 | 0-3 | 4 entries as discussed in the text |

Rank-3: The sub-sampling to select 4 out of 16 codewords can be done using either the Chordal distance or the Fubini-Study distance measure. Typically chordal distance is more suitable for lower SNRs whereas Fubini-Study is good at larger SNRs.

For any given choice of 4 codewords (comprising a sub-sampled codebook) we have 6 pairs. For each such pair (comprising of two 4×3 semi-unitary matrix codewords) we can compute a distance. The metric for that choice can be defined to be the minimum of the six distances. Finally, we can select the preferred choice as the one whose associated metric is the largest (i.e., maximum metric).

There can be multiple choices whose associated metrics are either equal to the maximum or are within a small margin (say 2% or 5%) of the maximum. All such choices are valid selections and represent good candidates.

In total there are 1820 choices (16 choose 4). We find that there are 5 choices whose metrics are equal to the maximum upon using the Chordal distance as the distance measure. Surprisingly these are the same choices whose metrics are again equal to the maximum when using the Fubini-Study distance as the distance measure. These indices are $\{0\ 2\ 8\ 10\}$, $\{0\ 9\ 10\ 11\}$, $\{1\ 2\ 3\ 8\}$, $\{1\ 3\ 9\ 11\}$, $\{12\ 13\ 14\ 15\}$.

Indeed no other choices have metrics in either case that are within 5% of the maximum. Thus, any one of these 5 choices is a good selection.

For rank-4: each codeword is a 4×4 unitary matrix so the distance (either Chordal distance or Fubini-Study) among any two pair of codewords is zero. Thus, a convenient way for sub-sampling is to re-use the indices obtained for the rank-3 case in the rank-4 legacy codebook, to obtain a sub-sampled rank-4 codebook.

For rank-2, for the enhanced codebooks the situation is a bit more complex since there are multiple inner (wideband) codewords.

Consider the sub-sampling to obtain a size 4 (2-bit) outer codebook (W2) from the original outer codebook of size 16.

For each one of the 1820 choices, we can consider each one of the 16 inner codewords and determine the Q distances (where Q is the number of pairs in the sub-sampled outer codebook and is 6 in this example) and then associate the minimum among the Q distances with that inner codeword for that choice. Then, the 16 associated distances (with the 16 inner codewords for that choice) can be combined in a suitable manner into one metric associated with that choice (a suitable way can be a product of the distances or their geometric mean with some regularization etc.). The one or more choices whose metric s are equal to the maximum (or are within a margin of the maximum) can be determined to be suitable candidates.

Upon performing the aforementioned procedure for rank-2 (with sub-sampled outer codebook size 4 so that Q=6) and the enhanced codebook 2a, we found the following 4 choices (sets of indices out of the 1820 possible ones) that have (near-) maximal metrics under both Chordal distance as well as the Fubini-Study distance:

{6 8 11 14}, {6 9 10 15}, {7 8 11 14}, {7 9 10 15}.

The following 8 choices (out of the 1820) have maximal metrics under Chordal distance:

{2 6 14 15}, {2 7 14 15}, {3 6 14 15}, {3 7 14 15}, {6 8 14 15}, {6 9 14 15}, {7 8 14 15}, {7 9 14 15}.

The following 164 choices (out of the 1820) have (near-) maximal metrics under Chordal distance. Each choice (comprising of 4 indices) is one column in the following:

Columns 1 through 20

```
0  0  0   0  0  0   0   0  0   0  0   0   0  0  0   0   0  0   0   0
2  2  2   2  2  2   2   2  2   2  2   2   2  3  3   3   3  3   3   3
4  4  4   4  5  5   5   6  6   7  7  14   4  4  4   4   5  5   5   5
6  7  14  15 6  7  14  15 14  15 14  15  15 6  7  14  15  6  7  14
```

Columns 21 through 40

```
0  0  0  0   0  0   0  0   0  0   0  0   0   0  0  0   0   0  0   0
3  3  3  3   3  3   4  4   4  4   4  5   5   5  5  5   6   6  6   7
5  6  6  7   7 14   6  6   7  7  14  6   6   7  7 14  10  11 14  10
15 14 15 14 15 15  14 15  14 15  15 14  15  14 15 15  15  15 14  15
```

Columns 41 through 60

```
0  0  1  1   1  1   1   1  1   1  1   1   1  1   1  1  1  1   1   1
7  7  2  2   2  2   2   2  2   2  2   2   2  2   3  3  3  3   3   3
11 14 4  4   4  5   5   5  6   6  7   7  14  4   4  4  4  5   5   5
14 15 6  7  14 15   6   7 14  15 14  15  15  6   7 14 15  6   7  14
```

Columns 61 through 80

```
1  1  1  1   1  1   1   1  1   1  1   1   1  1   1  1  1   1   1   1
3  3  3  3   3  3   3   3  4  4   4   4   4  5   5  5  5   5   6   6
5  5  5  6   6  7   7  14  6  6   7   7  14  6   6  7  7  14  10  11
7 14 15 14  15 14  15  15 14 15  14  15  15 14  15 14 15  15  15  14
```

Columns 81 through 100

```
1  1   1  1   2  2   2  2   2  2   2  2   2   2  2  2   2   2  2   2
6  7   7  7   4  4   4  4   4  4   4  5   5   5  5  5   5   5  6   7
14 10 11 14   6  6   7  7  12 13  14  6   6   7  7 12  13  14 14  14
15 15 14 15  14 15  14 15  15 14  15 14  15  14 15 15  14  15 15  15
```

Columns 101 through 120

```
3  3  3  3   3  3   3   3  3   3  3   3   3   3  3  3   4   4  4   4
4  4  4  4   4  4   4  5   5  5   5  5   5   5  6  7   6   6  6   6
6  6  7  7  12 13  14   6  6   7  7 12  13  14 14 14   8   8  9   9
14 15 14 15  15 14  15  14 15  14 15 15  14  15 15 15  14  15 14  15
```

Columns 121 through 140

```
4  4  4  4   4  4   4   4  4   4  4   5   5  5   5  5  5   5   5   5
6  7  7  7   7  7   8   8  8   9  9   9   6  6   6  6  6   6   7   7
14 8  8  9   9 14  12  13 14  12 13  14   8  8   9  9 14   8   8   9
15 14 15 14 15 15  15  15 14  15 14  15  15 14  15 14 15  15  14  15
```

-continued

Columns 141 through 160

5 5 5 5 5 5 5 5 6 6 6 6 6 6 7 7 7 7 7 7
7 7 8 8 8 9 9 9 8 8 8 9 9 9 8 8 8 9 9 9
9 14 12 13 14 12 13 14 10 11 14 10 11 14 10 11 14 10 11 14
15 15 15 14 15 15 14 15 15 14 15 15 14 15 15 14 15 15 14 15

Columns 161 through 164

8 8 9 9
10 11 10 11
12 13 12 13
15 14 15 14

Two of the aforementioned choices {2, 6, 14, 15} and {3, 7, 14, 15} are particularly interesting since they allow for orthogonal beam selection $(Y_1,Y_2)\in\{(e_2,e_4)\}$ with both co-phasing terms, $$W_{2,n} \in \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}.$$

These correspond to i2 indices {14, 15}. In addition beam selections $(Y_1,Y_2)\in\{(e_2, e_2), (e_4, e_4)\}$ with one of the two co-phasing terms, $$W_{2,n} \in \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}$$

is allowed, corresponding to i2 {2, 6} or {3, 7}.

Further down selection can be done by comparing with the average ratios of W2 selections from the original codebooks obtained via simulations.

We note that the Chordal distance and Fubini Study distance are more suitable to uncorrelated channels (such as those seen with wide antenna spacing).

For closely spaced antennas resulting in more correlated channels, we prefer to have more outer codebook entries for which the two columns in the resulting rank-2 codeword comprise of identical beam selections.

Based on above discussion and results shown in FIGS. 3 and 4, we find {0,2,4,6} could be a good option, for W2 subsampling, indicating that, $$W_{2,n} \in \left\{ \begin{bmatrix} Y_1 & Y_2 \\ Y_1 & -Y_2 \end{bmatrix} \right\}$$

with $(Y_1, Y_2) \in \{(e_1, e_1), (e_2, e_2), (e_3, e_3), (e_4, e_4),\}$ are selected.

However, due the issue of different W1 having the same beam group, with the above beam selections, the codeword redundancy cannot be avoided. One alternative solution is to choose only beam selections $(Y_1, Y_2) \in \{(e_1, e_1), (e_3, e_3)\}$ with both co-phasing terms, $$W_{2,n} \in \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\},$$

which corresponding to the W2 index $i_2 \in \{0, 1, 4, 5\}$. This beam selection scheme can still cover all 32 beams but avoid the codeword redundancy. In addition, it will be benefit to have one more co-phasing term. An analogous selection is $(Y_1, Y_2) \in \{(e_2, e_2), (e_4, e_4)\}$ with both co-phasing terms, $$W_{2,n} \in \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\},$$

which corresponds to the W2 index $i_2 \in \{2, 3, 6, 7\}$.

Thus the examples of the subsampling solutions for different ranks for PUCCH feedback mode 2-1 are presented in Table 5.2B.

TABLE 5.2B

PUCCH mode 2-1 codebook subsampling for 4-Tx codebook.

| | Relationship between the second PMI value and codebook index $i_2$ | |
|---|---|---|
| RI | Value of the second PMI $I_{PMI\ 2}$ | Codebook index $i_2$ |
| 1 | 0-15 | $I_{PMI\ 2}$ (no subsampling) |
| 2 | 0-3 | {0 2 4 6} or {0 1 4 5} or {2 3 6 7} or {2 6 14 15} or {3 7 1415} |
| 3 | 0-3 | {0 2 8 10} |
| 4 | 0-3 | {0 2 8 10} |

Figure 6:
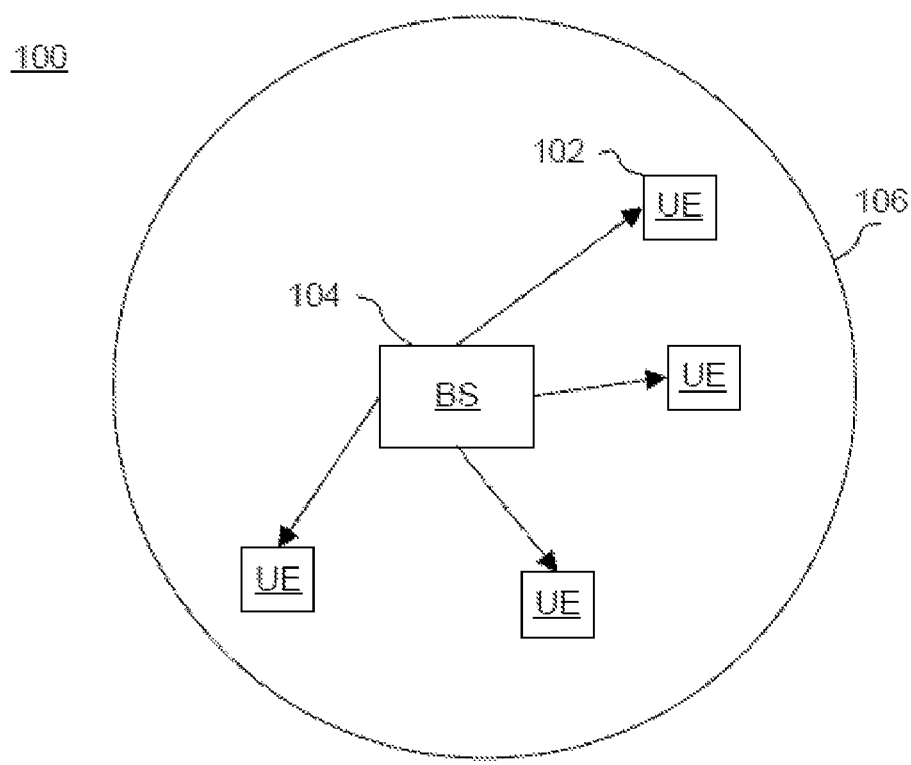
FIG. 6 is a block diagram of a MIMO system.

Referring now to FIG. 6, a multiple input multiple output (MIMO) system 100 in which the embodiments may be implemented is illustrated. In the downlink of system 100, one or more user equipments (UEs) 102 in cell 106 are served by base station (BS) 104. Each of user equipments 102 includes e.g. a transmitter, and base station 104 includes e.g. a receiver.

4. Conclusion we propose several schemes for PUCCH period CSI feedback based on enhanced 4-Tx codebook with double codebook structure W1W2.

APPENDIX

System level simulation parameters are summarized in Table A-1.

TABLE A-1

| Simulation Parameters | |
|---|---|
| Number of users per sector | 10 |
| Network synchronization | Synchronized |
| Antenna configuration (eNB) | 4 TX cross-polarized/ULA ant., 0.5-λ/4-λ spacing |
| Antenna configuration (user) | 2 RX cross-polarized/ULA ant. |
| Downlink transmission scheme | SU-MIMO or Dynamic SU/MU-MIMO scheduling. MU-MIMO pairing: Max 2 users/RB |
| Codebook | Rel. 8 codebook/Enhanced Codebooks |
| Downlink scheduler | PF in time and frequency |
| Scheduling granularity: | 5 RBs |
| Feedback assumptions | 5 ms periodicity and 5 ms delay; feedback mode 3-2 feedback without errors. |
| Sub-band granularity: | 5 RBs |
| Downlink HARQ scheme | Chase Combining |
| Downlink receiver type | LMMSE-IRC |
| Interference estimation error | Wishart distribution model as in 3gpp.TR36.829 |
| Feedback channel error | NA |
| Control channel and reference signal overhead | 3 OFDM symbols for control; Used TBS tables in TS 36.213 |
| TAB model (if considered) | Normal distribution $\mathcal{N}(0, \sigma^2)$, $\sigma = 12$ ns |

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a base station used in a wireless communications system, the method comprising:
   receiving at the base station, from a user equipment, a rank indication (RI), a first precoding matrix indicator (PMI), and a second PMI ($I_{PMI2}$) associated with a codebook index ($i_2$), for only four antenna ports, and
   serving, by the base station, the user equipment based on the $i_2$ for a physical uplink control channel (PUCCH) mode of at least one antenna port,
   wherein the codebook index $i_2$ is determined according to a table comprising:

| Relationship between the second PMI value and codebook index $i_2$ | | |
|---|---|---|
| RI | Value of the second PMI $I_{PMI\,2}$ | Codebook index $i_2$ |
| 1 | 0-15 | $I_{PMI\,2}$ |
| 2 | 0-3 | 0, 1, 4, 5 |
| 3 | 0-3 | 0, 2, 8, 10 |
| 4 | 0-3 | 0, 2, 8, 10. |

2. A method implemented in a user equipment used in a wireless communications system, the method comprising:
   transmitting, to a base station, a rank indication (RI), a first precoding matrix indicator (PMI), and a second PMI ($I_{PMI2}$) associated with a codebook index ($i_2$), for only four antenna ports, and
   receiving a signal, from the base station, based on the $i_2$ for a physical uplink control channel (PUCCH) mode of at least one antenna port,
   wherein the codebook index $i_2$ is determined according to a table comprising:

| Relationship between the second PMI value and codebook index $i_2$ | | |
|---|---|---|
| RI | Value of the second PMI $I_{PMI\,2}$ | Codebook index $i_2$ |
| 1 | 0-15 | $I_{PMI\,2}$ |
| 2 | 0-3 | 0, 1, 4, 5 |
| 3 | 0-3 | 0, 2, 8, 10 |
| 4 | 0-3 | 0, 2, 8, 10. |

3. The method as in claim 2, wherein the codebook index $i_2$ is for physical uplink control channel (PUCCH) mode 2-1 codebook subsampling in LTE (Long Term Evolution).

4. The method as in claim 1, wherein the codebook index $i_2$ is for physical uplink control channel (PUCCH) mode 2-1 codebook subsampling in LTE (Long Term Evolution).

5. A method implemented in a wireless communications system, the method comprising:
   transmitting, from a user equipment to a base station, a rank indication (RI), a first precoding matrix indicator (PMI), and a second PMI ($I_{PMI2}$) associated with a code book index ($i_2$), for only four antenna ports, and
   receiving signals, from the base station, based on the $i_2$ for a physical uplink control channel (PUCCH) mode of at least one antenna port,
   wherein the codebook index $i_2$ is determined according to a table comprising:

| Relationship between the second PMI value and codebook index $i_2$ | | |
|---|---|---|
| RI | Value of the second PMI $I_{PMI\,2}$ | Codebook index $i_2$ |
| 1 | 0-15 | $I_{PMI\,2}$ |
| 2 | 0-3 | 0, 1, 4, 5 |
| 3 | 0-3 | 0, 2, 8, 10 |
| 4 | 0-3 | 0, 2, 8, 10. |

6. A wireless communications system comprising:
   a base station; and
   a user equipment comprising at least one antenna port, the user equipment being configured to:
      transmit, to the base station, a rank indication (RI), a first precoding matrix indicator (PMI), and a second PMI ($I_{PMI2}$) associated with a code book index ($i_2$), for only four antenna ports; and
      receive signals, from the base station, based on the $i_2$ for a physical uplink control channel (PUCCH) mode of the at least one antenna port,
   wherein the codebook index $i_2$ is determined according to a table comprising:

| | Relationship between the second PMI value and codebook index $i_2$ | |
|---|---|---|
| RI | Value of the second PMI $I_{PMI\,2}$ | Codebook index $i_2$ |
| 1 | 0-15 | $I_{PMI\,2}$ |
| 2 | 0-3 | 0, 1, 4, 5 |
| 3 | 0-3 | 0, 2, 8, 10 |
| 4 | 0-3 | 0, 2, 8, 10. |

7. A base station comprising at least one antenna port, the base station being configured to:
  receive, from a user equipment, a rank indication (RI), a first precoding matrix indicator (PMI), and a second PMI ($I_{PMI2}$) associated with a codebook index ($i_2$), for only four antenna ports, and
  serve the user equipment based on the $i_2$ for a physical uplink control channel (PUCCH) mode of at least one antenna port, wherein the codebook index $i_2$ is determined according to a table comprising:

| | Relationship between the second PMI value and codebook index $i_2$ | |
|---|---|---|
| RI | Value of the second PMI $I_{PMI\,2}$ | Codebook index $i_2$ |
| 1 | 0-15 | $I_{PMI\,2}$ |
| 2 | 0-3 | 0, 1, 4, 5 |
| 3 | 0-3 | 0, 2, 8, 10 |
| 4 | 0-3 | 0, 2, 8, 10. |

8. The method as in claim 7, wherein the codebook index $i_2$ is for physical uplink control channel (PUCCH) mode 2-1 codebook subsampling in LTE (Long Term Evolution).

* * * * *